United States Patent
Li et al.

(10) Patent No.: US 12,542,643 B2
(45) Date of Patent: Feb. 3, 2026

(54) COMMUNICATION METHOD AND APPARATUS

(71) Applicant: HUAWEI TECHNOLOGIES CO., LTD., Guangdong (CN)

(72) Inventors: Ruijie Li, Beijing (CN); Lei Guan, Beijing (CN); Shengyu Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 369 days.

(21) Appl. No.: 18/303,635

(22) Filed: Apr. 20, 2023

(65) Prior Publication Data

US 2023/0261844 A1  Aug. 17, 2023

Related U.S. Application Data

(63) Continuation of application No. PCT/CN2020/123004, filed on Oct. 22, 2020.

(51) Int. Cl.
*H04L 5/00* (2006.01)
*H04B 7/06* (2006.01)
*H04W 72/566* (2023.01)

(52) U.S. Cl.
CPC ......... *H04L 5/0055* (2013.01); *H04B 7/0626* (2013.01); *H04W 72/569* (2023.01)

(58) Field of Classification Search
CPC ... H04L 5/0055; H04L 1/1614; H04L 1/1854; H04L 1/1671; H04B 7/0626; H04W 72/569
USPC ...................................................... 370/329
See application file for complete search history.

(56) References Cited

U.S. PATENT DOCUMENTS

| | | | |
|---|---|---|---|
| 2015/0163794 A1* | 6/2015 | Liang | H04W 72/23 370/329 |
| 2019/0123881 A1* | 4/2019 | Lee | H04L 1/1822 |
| 2020/0021401 A1 | 1/2020 | Guan | |
| 2020/0145868 A1 | 5/2020 | Shi et al. | |
| 2023/0292339 A1* | 9/2023 | Zhang | H04L 5/0057 |

FOREIGN PATENT DOCUMENTS

| | | |
|---|---|---|
| CN | 108631935 A | 10/2018 |
| CN | 110431783 A | 11/2019 |
| CN | 110679191 A | 1/2020 |

(Continued)

OTHER PUBLICATIONS

International Search Report and Written Opinion issued in PCT/CN2020/123004, dated May 12, 2021, 9 pages.

(Continued)

*Primary Examiner* — Mang Hang Yeung

(57) ABSTRACT

A communication method and apparatus resolve a problem that a terminal device frequently sends channel state information or an uplink reference signal, so that signaling overheads of the terminal device can be reduced. The method includes: determining a first feedback information set, and sending first channel state information or a first uplink reference signal to a network device when the first feedback information set meets a first condition. The first feedback information set includes at least one piece of feedback information, and the feedback information is a negative acknowledgment NACK or an acknowledgment ACK.

20 Claims, 3 Drawing Sheets

(56) References Cited

FOREIGN PATENT DOCUMENTS

| | | |
|---|---|---|
| CN | 111130706 A | 5/2020 |
| CN | 111147217 A | 5/2020 |
| EP | 4096130 A1 | 11/2022 |
| EP | 3695559 B1 | 2/2023 |
| WO | 2018171387 A1 | 9/2018 |

OTHER PUBLICATIONS

Extended European Search Report issued in EP20958257.6, dated Oct. 4, 2023, 7 pages.

* cited by examiner

COMMUNICATION METHOD AND APPARATUS

CROSS-REFERENCE TO RELATED APPLICATIONS

This application is a continuation of International Patent Application No. PCT/CN2020/123004, filed on Oct. 22, 2020. The disclosure of the aforementioned application is hereby incorporated by reference in its entirety.

TECHNICAL FIELD

Embodiments of this disclosure relate to the field of communication technologies, and in particular, to a communication method and apparatus.

BACKGROUND

To improve reliability of data transmission, a terminal device may receive a reference signal, for example, a channel state information-reference signal (CSI-RS), from a network device, estimate more accurate channel state information (CSI) by using the CSI-RS, and send the channel state information to the network device, so that the network device sends downlink information to the terminal device by using the channel state information.

Generally, manners of sending the CSI include: periodically sending the CSI (periodic CSI, P-CSI), semi-persistently sending the CSI (semi-persistent CSI, SP-CSI), and aperiodically sending the CSI (aperiodic CSI, A-CSI). For the A-CSI, the network device triggers, by using downlink control information (DCI), the terminal device to receive the CSI-RS from the network device and measure a channel and interference by using the CSI-RS. After obtaining the CSI, the terminal device sends the CSI to the network device. For the P-CSI and configured and activated SP-CSI, the terminal device periodically receives the CSI-RS, measures the channel and interference based on the CSI-RS, and periodically sends the CSI to the network device. However, in the foregoing enumerated sending manners, the terminal device frequently sends unnecessary CSI, and signaling overheads are high.

SUMMARY

This disclosure provides a communication method and apparatus, to reduce signaling overheads for sending channel state information or an uplink reference signal by a terminal device.

According to a first aspect, a communication method is provided. The communication method includes: determining a first feedback information set, and sending first channel state information or a first uplink reference signal to a network device when the first feedback information set meets a first condition. The first feedback information set includes at least one piece of feedback information, and the feedback information is a negative acknowledgment (NACK) or an acknowledgment (ACK).

Based on the communication method in the first aspect, a terminal device determines the first feedback information set, determines, based on the first feedback information set, whether to send the first channel state information or the first uplink reference signal to the network device, and sends the first channel state information or the first uplink reference signal to the network device when the first feedback information set meets the first condition. In this way, the terminal device may determine, based on the first feedback information set, whether to send channel state information or an uplink reference signal, and does not need to frequently send the channel state information or the uplink reference signal, so that signaling overheads are reduced. In addition, the network device can be prevented from triggering measurement of a channel and sending of the channel state information, and latency in obtaining the channel state information or the uplink reference signal by the network device can be shortened, so that a requirement of a low-latency service is met.

In a possible implementation, the first condition may be a condition that a characteristic of a NACK in the first feedback information set meets.

In a possible implementation, the characteristic of the NACK may include: a location of the NACK in the first feedback information set and/or a quantity of NACKs.

In a possible implementation, the first condition may include one or more of the following: A ratio of a quantity of NACKs in the first feedback information set to a quantity of ACKs in the first feedback information set is greater than or equal to a first threshold. The quantity of NACKs in the first feedback information set is greater than or equal to a second threshold. A quantity of consecutive NACKs in the first feedback information set is greater than or equal to a third threshold. A ratio of the quantity of NACKs in the first feedback information set to a total quantity of feedback information in the first feedback information set is greater than or equal to a fourth threshold. Optionally, the first threshold, the second threshold, the third threshold, and the fourth threshold may be preset or preconfigured.

In a possible implementation, the first condition may include: The first feedback information set includes at least one piece of high-priority feedback information. Optionally, the high-priority feedback information corresponds to an ultra-reliable and low-latency scenario (URLLC) service, and the high-priority feedback information may include a high-priority NACK or a high-priority ACK.

In a possible implementation, the first condition may include: The first feedback information set includes at least one piece of low-priority feedback information. Optionally, the low-priority feedback information may correspond to an enhanced mobile broadband (eMBB) service, and the low-priority feedback information may include a low-priority NACK or a low-priority ACK.

In a possible implementation, the first channel state information or the first uplink reference signal may be configured based on first configuration information, and a first feedback information set corresponding to the first configuration information may include at least one piece of high-priority feedback information. In this way, the terminal device may send different first channel state information or first uplink reference signals to the network device based on different priorities of feedback information included in the first feedback information set, to meet diversified requirements of different services.

In a possible implementation, the first channel state information or the first uplink reference signal may be configured based on second configuration information, and a first feedback information set corresponding to the second configuration information may include at least one piece of low-priority feedback information. In this way, the terminal device may send different first channel state information or first uplink reference signals to the network device based on different priorities of feedback information included in the first feedback information set, to meet diversified requirements of different services.

In a possible implementation, the communication method according to the first aspect may further include: muting sending of the first channel state information or the first uplink reference signal when the first feedback information set is not sent to the network device. To be specific, if the terminal device does not send the first feedback information set to the network device, or sending of the first feedback information set is canceled, the sending of the first channel state information or the first uplink reference signal may be canceled, or the first channel state information or the first uplink reference signal is not sent, to reduce signaling overheads.

In a possible implementation, the first feedback information set may include at least one piece of high-priority feedback information. The communication method according to the first aspect may further include: determining a second feedback information set. The second feedback information set may include at least one piece of low-priority feedback information, and the second feedback information set and the first feedback information set are transmitted on a same channel. Optionally, a resource corresponding to the second feedback information set may partially or completely overlap a resource corresponding to the first feedback information set.

In a possible implementation, the communication method according to the first aspect may further include: sending second channel state information or a second uplink reference signal to the network device when the second feedback information set meets a second condition.

Optionally, the second condition is a condition that a characteristic of a NACK in the second feedback information set meets. The characteristic of the NACK may include: a location of the NACK in the second feedback information set and/or a quantity of NACKs.

Optionally, the second condition includes one or more of the following: A ratio of a quantity of NACKs in the second feedback information set to a quantity of ACKs in the second feedback information set is greater than or equal to a fifth threshold. The quantity of NACKs in the second feedback information set is greater than or equal to a sixth threshold. A quantity of consecutive NACKs in the second feedback information set is greater than or equal to a seventh threshold. A ratio of the quantity of NACKs in the second feedback information set to a total quantity of feedback information in the second feedback information set is greater than or equal to an eighth threshold.

In another possible implementation, the communication method according to the first aspect may further include: muting sending of the second channel state information or the second uplink reference signal when the first feedback information set meets the first condition and the second feedback information set meets the second condition. To be specific, when the first feedback information set meets the first condition and the second feedback information set meets the second condition, the first channel state information or the first uplink reference signal may be sent to the network device, and the sending of the second channel state information or the second uplink reference signal is canceled, or the second channel state information or the second uplink reference signal is not sent, to reduce signaling overheads.

In another possible implementation, the communication method according to the first aspect may further include: sending the second channel state information or the second uplink reference signal to the network device when the first feedback information set does not meet the first condition and the second feedback information set meets the second condition. In this way, reliability of data transmission can be ensured.

Optionally, the NACK is a NACK obtained after downlink information is unsuccessfully decoded. To be specific, when it is determined whether the first feedback information set meets the first condition, only the NACK obtained after the downlink information is unsuccessfully decoded may be used as a valid NACK.

In this way, compared with use of a first condition in which both the NACK obtained after the downlink information is unsuccessfully decoded and a full NACK are used as the valid NACK, use of a first condition in which only the NACK obtained after the downlink information is unsuccessfully decoded is used as the valid NACK can further reduce unnecessary overheads for sending the first channel state information or the first uplink reference signal.

Optionally, the first feedback information set includes at least two pieces of feedback information. In other words, the terminal device may determine, for a plurality of pieces of feedback information, whether to send the first channel state information or the first uplink reference information, so that a quantity of times of sending the first channel state information or the first uplink reference information can be reduced, and therefore signaling overheads of time between the terminal device and the network device are reduced.

According to a second aspect, a communication method is provided. The communication method includes: receiving a first feedback information set from a terminal device, and receiving first channel state information or a first uplink reference signal from the terminal device. The first feedback information set includes at least one piece of feedback information, the feedback information is a negative acknowledgment NACK or an acknowledgment ACK, and the first feedback information set meets a first condition.

In a possible implementation, the first condition may be a condition that a characteristic of a NACK in the first feedback information set meets.

In a possible implementation, the characteristic of the NACK may include: a location of the NACK in the first feedback information set and/or a quantity of NACKs.

In a possible implementation, the first condition may include one or more of the following: A ratio of a quantity of NACKs in the first feedback information set to a quantity of ACKs in the first feedback information set is greater than or equal to a first threshold. The quantity of NACKs in the first feedback information set is greater than or equal to a second threshold. A quantity of consecutive NACKs in the first feedback information set is greater than or equal to a third threshold. A ratio of the quantity of NACKs in the first feedback information set to a total quantity of feedback information in the first feedback information set is greater than or equal to a fourth threshold. Optionally, the first threshold, the second threshold, the third threshold, and the fourth threshold are preset or preconfigured.

In a possible implementation, the first condition may include: The first feedback information set includes at least one piece of high-priority feedback information.

In a possible implementation, the first condition may include: The first feedback information set includes at least one piece of low-priority feedback information.

In a possible implementation, the first channel state information or the first uplink reference signal may be configured based on first configuration information, and a first feedback information set corresponding to the first configuration information may include at least one piece of high-priority feedback information.

In a possible implementation, the first channel state information or the first uplink reference signal may be configured based on second configuration information, and a first feedback information set corresponding to the second configuration information may include at least one piece of low-priority feedback information.

In a possible implementation, when the first feedback information set from the terminal device is not received, receiving of the first channel state information or the first uplink reference signal is muted.

In a possible implementation, the first feedback information set may include at least one piece of high-priority feedback information. The communication method according to the second aspect may further include: receiving a second feedback information set from the terminal device. The second feedback information set may include at least one piece of low-priority feedback information, and the second feedback information set and the first feedback information set are transmitted on a same channel.

In a possible implementation, the communication method according to the second aspect may further include: receiving second channel state information or a second uplink reference signal from the terminal device. The second feedback information set meets a second condition, or the first feedback information set does not meet the first condition and the second feedback information set meets the second condition.

In a possible implementation, the communication method according to the second aspect may further include: muting receiving of the second channel state information or the second uplink reference signal. The first feedback information set meets the first condition and the second feedback information set meets the second condition.

In a possible implementation, the second condition is a condition that a characteristic of a NACK in the second feedback information set meets.

In a possible implementation, the characteristic of the NACK may include: a location of the NACK in the second feedback information set and/or a quantity of NACKs.

In a possible implementation, the second condition may include one or more of the following: A ratio of a quantity of NACKs in the second feedback information set to a quantity of ACKs in the second feedback information set is greater than or equal to a fifth threshold. The quantity of NACKs in the second feedback information set is greater than or equal to a sixth threshold. A quantity of consecutive NACKs in the second feedback information set is greater than or equal to a seventh threshold. A ratio of the quantity of NACKs in the second feedback information set to a total quantity of feedback information in the second feedback information set is greater than or equal to an eighth threshold.

Optionally, the NACK is a NACK obtained after the terminal device unsuccessfully decodes downlink information.

Optionally, the first feedback information set includes at least two pieces of feedback information.

In addition, for a technical effect of the communication method in the second aspect, refer to the technical effect of the communication method in any one of the possible implementations of the first aspect. Details are not described herein again.

According to a third aspect, a communication apparatus is provided. The communication apparatus includes a module configured to perform any method in the first aspect.

In this disclosure, the communication apparatus according to the third aspect may be a terminal device, or a chip (system) or another part or component that may be disposed in a terminal device.

In addition, for a technical effect of the communication apparatus in the third aspect, refer to the technical effect of the communication method in any implementation of the first aspect. Details are not described herein again.

According to a fourth aspect, a communication apparatus is provided. The communication apparatus includes a unit or a module configured to perform any method in the first aspect.

In this disclosure, the communication apparatus according to the fourth aspect may be a network device, or a chip (system) or another part or component that may be disposed in a network device.

In addition, for a technical effect of the communication apparatus in the fourth aspect, refer to the technical effect of the communication method in any implementation of the first aspect. Details are not described herein again.

According to a fifth aspect, a communication apparatus is provided. The communication apparatus includes a processor. The processor is coupled to a memory, and the memory is configured to store a computer program. The processor is configured to execute the computer program stored in the memory, to enable the communication apparatus to perform the communication method in any one of the possible implementations of the first aspect and the second aspect.

In a possible design, the communication apparatus in the fifth aspect may further include a transceiver. The transceiver may be a transceiver circuit or an input/output port. The transceiver may be used by the communication apparatus to communicate with another communication apparatus.

In this disclosure, the communication apparatus in the fifth aspect may be a terminal device or a network device, or a chip or a chip system disposed in a terminal device or a network device.

In addition, for a technical effect of the communication apparatus in the fifth aspect, refer to the technical effect of the communication method in any implementation of the first aspect and the second aspect. Details are not described herein again.

According to a sixth aspect, a chip system is provided. The chip system includes a processor and an input/output port. The processor is configured to implement a processing function in the first aspect and the second aspect, and the input/output port is configured to implement sending and receiving functions in the first aspect and the second aspect.

In a possible design, the chip system further includes a memory. The memory is configured to store program instructions and data for implementing functions in the first aspect and the second aspect.

The chip system may include a chip, or may include a chip and another discrete component.

According to a seventh aspect, a communication system is provided. The system includes a network device and a terminal device.

According to an eighth aspect, a computer-readable storage medium is provided. The computer-readable storage medium stores computer instructions. When the computer instructions are run on a computer, the computer is enabled to perform the communication method in any one of the possible implementations of the first aspect and the second aspect.

According to a ninth aspect, a computer program product including instructions is provided. The computer program product includes a computer program or the instructions. When the computer program or the instructions is/are run on a computer, the computer is enabled to perform the communication method in any one of the possible implementations of the first aspect and the second aspect.

DESCRIPTION OF EMBODIMENTS

The following describes the technical solutions of this disclosure with reference to the accompanying drawings.

The technical solutions in embodiments of this disclosure may be applied to various communication systems, for example, a wireless fidelity (Wi-Fi) system, a vehicle to everything (V2X) communication system, a device-to-device (D2D) communication system, an internet of vehicles communication system, a 4th generation (4G) mobile communication system such as a long term evolution (LTE) system or a worldwide interoperability for microwave access (WiMAX) communication system, a 5th generation (5G) mobile communication system such as a new radio (NR) system, and/or a future communication system such as a 6th generation (6G) mobile communication system.

All aspects, embodiments, or features are presented in this disclosure by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In embodiments of this disclosure, the word such as "example" or "for example" is used to represent giving an example, an illustration, or a description. Any embodiment or design scheme described as an "example" in this disclosure should not be explained as being more preferred or having more advantages than another embodiment or design scheme. Specifically, the term "example" is used to present a concept in a specific manner.

In embodiments of this disclosure, "downlink information" may include "downlink data", the "downlink data" may be carried on a "downlink data channel" for transmission, and the "downlink information", the "downlink data", and the "downlink data channel" may sometimes be interchangeably used. It should be noted that the expressed meanings of the "downlink information", the "downlink data", and the "downlink data channel" are consistent when a difference between the "downlink information", the "downlink data", and the "downlink data channel" is not emphasized.

A network architecture and a service scenario described in embodiments of this disclosure are intended to describe the technical solutions in embodiments of this disclosure more clearly, and do not constitute a limitation on the technical solutions provided in embodiments of this disclosure. A person of ordinary skill in the art may know that: With the evolution of the network architecture and the emergence of new service scenarios, the technical solutions provided in embodiments of this disclosure are also applicable to similar technical problems.

Figure 1:
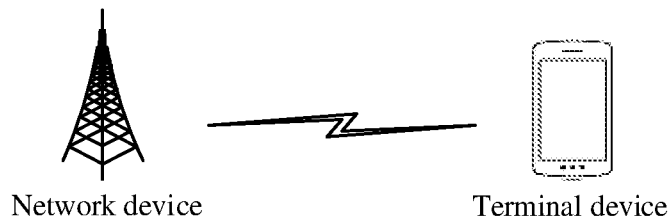
FIG. 1 is a schematic diagram of an architecture of a communication system according to an embodiment of this disclosure.

FIG. 1 is a schematic diagram of an architecture of a communication system to which a communication method according to an embodiment of this disclosure is applicable. For ease of understanding this embodiment of this disclosure, the communication system shown in FIG. 1 is first used as an example to describe in detail a communication system applicable to embodiments of this disclosure. It should be noted that the solutions in embodiments of this disclosure may also be applied to another mobile communication system, and a corresponding name may also be replaced with a name of a corresponding function in the another mobile communication system.

As shown in FIG. 1, the communication system includes a terminal device and a network device.

The terminal device is a terminal accessing the communication system and having a wireless transceiver function, or a chip or a chip system that may be disposed in the terminal. The terminal device may also be referred to as user equipment (UE), a user apparatus, an access terminal, a subscriber unit, a subscriber station, a mobile station (MS), a remote station, a remote terminal, a mobile device, a user terminal, a terminal, a wireless communication device, a user agent, or a user apparatus. The terminal device in embodiments of this disclosure may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, a vehicle-mounted terminal, a road side unit (RSU) having a terminal function, or the like. The vehicle-mounted terminal may be a vehicle-mounted module, a vehicle-mounted assembly, a vehicle-mounted component, a vehicle-mounted chip, or a vehicle-mounted unit. The network device is a device that is located on a network side of the communication system and that has a wireless transceiver function, or a chip or a chip system that can be disposed in the device. The network device includes but is not limited to: an access point (AP) (for example, a home gateway, a router, a server, a switch, or a bridge) in a wireless fidelity (Wi-Fi) system, a base station, an evolved NodeB (eNB), a home base station (for example, a home evolved NodeB, or a home NodeB, HNB), a baseband unit (BBU), a wireless relay node, a wireless backhaul node, or a transmission point (Tp or a transmission and reception point, TRP,), or the like. Alternatively, the network device may be a gNB or a transmission point (a TRP or a TP) in a 5G system such as a new radio (NR) system, one or a group of antenna panels (including a plurality of antenna panels) of a base station in the 5G system, or may be a network node, for example, a baseband unit (BBU), a central unit (CU), a distributed unit (DU), or an RSU having a base station function, that forms a gNB or a transmission point. The CU may include a control plane (a central unit-control plane, CU-CP) and a user plane (a central unit-user plane, CU-UP). The network device may alternatively be a device including a CU and a distributed unit DU.

It should be noted that a communication method according to an embodiment of this disclosure is applicable to or assist in communication between the terminal device and the network device shown in FIG. 1.

It should be understood that FIG. 1 is merely a simplified schematic diagram of an example for ease of understanding. The communication system may further include another network device and/or another terminal device that are/is not shown in FIG. 1.

For ease of understanding, the following describes configuration information of a reference signal in embodiments of this disclosure.

For example, if the reference signal is a CSI-RS, the configuration information may include configured information elements (IEs), such as a CSI resource configuration (CSI-ResourceConfig) and a CSI report configuration (CSI-ReportConfig).

The CSI resource configuration may be used to configure resource-related information for CSI measurement. For example, the CSI resource configuration may include one or more of the following: a CSI resource configuration identifier (CSI-ResourceConfigId), resource type configuration information, and CSI resource set list (configuration information.

Specifically, the CSI resource configuration identifier is an identifier of the CSI resource configuration, and the CSI resource configuration identifier may be associated with the CSI report configuration. For example, a CSI resource configuration identifier 3 is associated with a CSI report configuration whose report configuration identifier is 1. In this case, it may be learned that configuration information whose CSI resource configuration identifier is 3 corresponds to CSI report configuration information whose report configuration identifier is 1.

The resource type configuration information may include periodic, semi-persistent, and non-periodic resources. Based on functions of CSI-RS resources, the CSI-RS resources may be classified into: a non-zero power CSI-RS (NZP-CSI-RS) used for channel measurement, a zero power CSI-RS (ZP-CSI-RS) used for interference measurement, and an NZP-CSI-RS used for interference measurement. The ZP-CSI-RS may also be referred to as channel state information interference measurement CSI-IM. For a ZP-CSI-RS resource, the network device does not send any information on the ZP-CSI-RS resource, and the terminal device performs detection on the resource. Detected information is interference. For an NZP-CSI-RS resource, the network device sends a known sequence on the resource, and the terminal device may obtain CSI and/or interference by using the known sequence.

The CSI resource set list configuration information may be used to configure a resource set list. The configured resource set list may include an NZP-CSI-RS resource set and/or a CSI-IM resource set. A configuration of a resource set may be associated by using an identifier of the resource set. For example, configuration information of the NZP-CSI-RS resource set may be associated by using an identifier of the NZP-CSI-RS resource set (NZP-CSI-RS-ResourceSetId), and configuration information of the CSI-IM resource set may be associated by using an identifier of the CSI-IM resource set (CSI-IM-ResourceSetId).

For example, the configuration information of the NZP-CSI-RS resource set may be used to configure a set of resources for channel measurement, and the set of resources may include at least one NZP-CSI-RS resource. A configuration of a resource may be associated by using an identifier of the resource. For example, configuration information of the NZP-CSI-RS resource may be associated by using an identifier of the NZP-CSI-RS resource (NZP-CSI-RS-ResourceId). The configuration information of the NZP-CSI-RS resource may be used to configure information related to the NZP-CSI-RS resource. For example, the terminal device may measure channel information based on the NZP-CSI-RS resource, and feed back CSI. When one NZP-CSI-RS resource set includes a plurality of NZP-CSI-RS resources, the terminal device may specifically feed back an NZP-CSI-RS resource on which the CSI is obtained through measurement. This may be indicated by indication information of a CSI-RS resource (CSI-RS resource indicator, CRI) fed back by the terminal device. For example, CRI=0. It may indicate that the CSI fed back by the terminal device is channel information obtained through measurement on a resource whose resource ID is 0.

For example, configuration information of the CSI-IM resource set may be used to configure a set of resources for interference measurement, and is similar to the configuration information of the NZP-CSI-RS resource set. Details are not described in this embodiment of this disclosure. The configuration information of the CSI-IM resource may be used to configure information related to the CSI-IM resource, and the configuration information of the CSI-IM resource may be associated by using an identifier of the CSI-IM resource.

The CSI report configuration may be used to configure a parameter, for example, a type of reported CSI or a reported measurement indicator, related to CSI reporting. For example, the CSI report configuration may include but is not limited to one or more of the following: a report configuration identifier (ReportConfigId), resource for channel measurement (ResourcesForChannel Measurement) configuration information, CSI-IM resource for interference measurement (CSI-IM-RessourcesForInterference) configuration information, NZP-CSI-RS resource for interference measurement (NZP-CSI-RS-ResourcesForInterference) configuration information, a report configuration type (ReportConfigType), a report quantity (reportQuantity), and a wideband feedback or a narrowband feedback.

Specifically, the report configuration identifier is an identifier of the CSI report configuration. The resource for channel measurement configuration information may be used to configure a CSI-RS resource for channel measurement. The CSI resource configuration may be associated by using an identifier of the CSI resource configuration (CSI-ResourceConfigId). The CSI-IM resource for interference measurement configuration information may be used to configure a CSI-RS resource for interference measurement. The CSI resource configuration may be associated by using the identifier of the CSI resource configuration (CSI-ResourceConfigId). The NZP-CSI-RS resource for interference measurement configuration information may be used to configure an NZP-CSI-RS resource for interference measurement. The CSI resource configuration may be associated by using the identifier of the CSI resource configuration (CSI-ResourceConfigId).

The report configuration type may indicate manners of sending the CSI, and may include P-CSI, SP-CSI, and A-CSI. The P-CSI may be configured by the network device for the terminal device through a radio resource control (RRC) message, and does not need to be triggered by the network device. The SP-CSI may be triggered by the network device through a media access control control element (MAC CE) or DCI, and the terminal device periodically sends the CSI after the triggering. The CSI is sent on a physical uplink control channel (PUCCH) through SP-CSI triggered by the MAC CE, and the CSI is sent on a physical uplink shared channel (PUSCH) through SP-CSI triggered by the DCI. The A-CSI is triggered by the network device by using DCI, and is reported only once on a specified PUSCH in a specified slot after being triggered.

The report quantity may include a CRI, a rank indicator (RI), a precoding matrix indicator (PMI), a channel quality indicator (CQI), and/or the like. The network device may send different configuration information to the terminal device, so that the terminal device reports all or some of the configuration information. The wideband feedback may indicate that only one value is fed back in an entire reporting bandwidth. The narrowband feedback may indicate that feedback is separately performed on each subband.

It should be noted that in an NR system, an uplink reference signal may be used to measure an uplink channel In a time division duplex (TDD) system, downlink channel state information may be obtained by using reciprocity between uplink and the downlink channels. Similar to CSI estimation by using a CSI-RS, the CSI may be estimated by using the uplink reference signal. The uplink reference signal may be a sounding reference signal (SRS). Configuration information of an uplink reference signal SRS is similar to configuration information of a reference signal CSI-RS. Details are not described in this embodiment of this disclosure.

Figure 2:
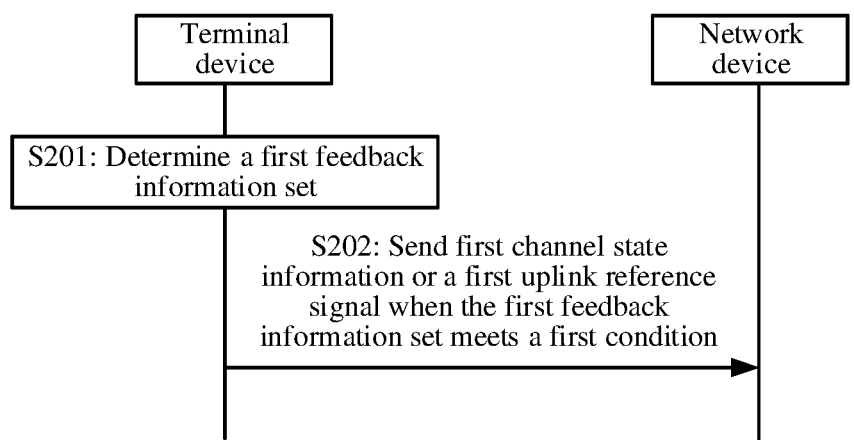
FIG. 2 is a schematic flowchart 1 of a communication method according to an embodiment of this disclosure.

The communication method provided in embodiments of this disclosure is applicable to a scenario in which the terminal device sends uplink information to the network device and a scenario in which the terminal device receives downlink information from the network device. FIG. 2 is a schematic flowchart 1 of a communication method according to an embodiment of this disclosure. A scenario in which a terminal device receives downlink information from a network device is mainly used as an example for description. The communication method is applicable to communication between the terminal device and the network device shown in FIG. 1.

As shown in FIG. 2, the communication method includes the following steps.

S201: The terminal device determines a first feedback information set.

For example, the first feedback information set includes at least one piece of feedback information, and the feedback information is a NACK or an ACK. Specifically, if the terminal device successfully decodes the downlink information from the network device or successfully receives the downlink information, the terminal device may send an ACK to the network device. Alternatively, if the terminal device unsuccessfully decodes the downlink information from the network device or unsuccessfully receives the downlink information, the terminal device may send a NACK to the network device. The first feedback information set may include one or more ACKs and/or one or more NACKs.

Optionally, the first feedback information set includes a codebook sequence including at least one NACK and/or at least one ACK. For example, the first feedback information set may be NAAAANA, where "N" represents a NACK, and "A" represents an ACK.

For example, the first feedback information set includes at least one information bit, and one information bit may carry one piece of feedback information. For example, when the information bit is 0, it indicates that the feedback information is a NACK. When the information bit is 1, it indicates that the feedback information is an ACK. For another example, when the information bit is 0, it indicates that the feedback information is an ACK. When the information bit is 1, it indicates that the feedback information is a NACK.

For ease of reading, this embodiment of this disclosure is described by using an example in which if the terminal device unsuccessfully decodes the downlink information, a decoding result is a NACK, and corresponding feedback information is set to "N"; and if the terminal device correctly decodes the downlink information, a decoding result is an ACK, and corresponding feedback information is set to "A".

Optionally, the first feedback information set includes a full NACK and/or a NACK obtained after the downlink information is unsuccessfully decoded.

The following describes the full NACK. The downlink information is used as an example. Each piece of possible downlink information has one piece of corresponding feedback information. A specific meaning of the possible downlink information is as follows: The network device may send downlink information to the terminal device on a resource, but the network device may alternatively choose not to send downlink information on the resource.

If the terminal device receives the downlink information, the feedback information being specifically a NACK or an ACK is determined based on decoding of the downlink information. For example, if the downlink information is received and decoded correctly, the feedback information is an ACK; otherwise, the feedback information is a NACK.

If the terminal device does not receive the downlink information, the terminal device sets feedback information corresponding to the downlink information that is not received to a NACK. The NACK is a full NACK, and indicates that the terminal device does not actually receive the downlink information corresponding to the feedback information. For example, a reason why the terminal device does not receive the downlink information may be that the network device does not send the downlink information to the terminal device, or the network device sends the downlink information to the terminal device, but the terminal device does not receive the downlink information because the terminal device does not receive scheduling information of the downlink information.

Figure 3:
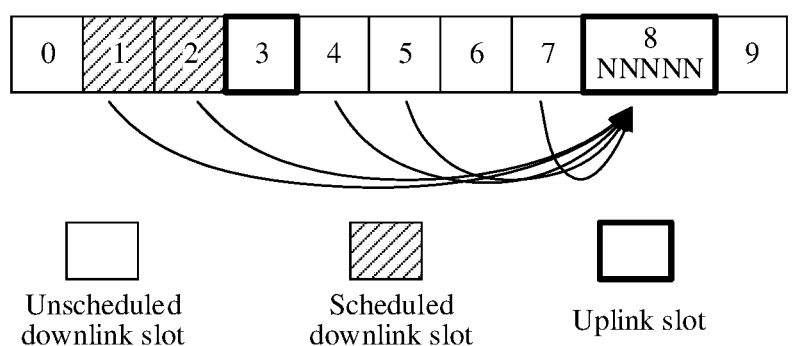
FIG. 3 is a schematic diagram of a first feedback information set according to an embodiment of this disclosure.

FIG. 3 is a schematic diagram of a first feedback information set according to an embodiment of this disclosure.

For example, a time unit is a slot. FIG. 3 includes slots numbered 0 to 9. It is assumed that slots numbered 3 and 8 are uplink slots, and slot at other positions are downlink slots. Downlink slots numbered 1, 2, 4, 5, and 7 correspond to the uplink slot numbered 8. Specifically, feedback information corresponding to downlink information sent in the downlink slot numbered 1 is sent to a network device in the uplink slot numbered 8. Similarly, feedback information corresponding to downlink information sent in the downlink slots numbered 2, 4, 5, and 7 is sent to the network device in the uplink slot numbered 8. Therefore, there are a plurality of pieces of feedback information in the uplink slot numbered 8, and the plurality of pieces of feedback information respectively correspond to all possible downlink information in the downlink slots numbered 1, 2, 4, 5, and 7. It is assumed that there is only one piece of possible downlink information in each of the slots numbered 1, 2, 4, 5, and 7. In this case, there are five pieces of feedback information in the uplink slot numbered 8, and the five pieces of feedback information respectively correspond to possible downlink information in the downlink slots numbered 1, 2, 4, 5, and 7.

With reference to FIG. 3, it is assumed that the downlink slots numbered 1 and 2 are scheduled downlink slots, and other downlink slots are unscheduled downlink slots. The network device sends downlink information only in the downlink slots numbered 1 and 2, and does not send downlink information in the downlink slots numbered 4, 5, and 7. A terminal device receives and decodes the two pieces of downlink information, and decoding results are NACKs. In this case, the first feedback information set is NNNNN. NACKs (namely, the first two results "N"s) corresponding to the downlink slots numbered 1 and 2 are determined based on the decoding results, and NACKs (namely, the last three "N"s) corresponding to the downlink slots numbered 4, 5, and 7 are full NACKs.

Optionally, the first feedback information set includes at least two pieces of feedback information. For example, the first feedback information set may include one NACK and one ACK, or include two NACKs, or include two ACKs.

In other words, the terminal device may determine, based on a plurality of pieces of feedback information, whether to send first channel state information or first uplink reference information, so that a quantity of times of sending the first channel state information or the first uplink reference information can be reduced, and therefore signaling overheads between the terminal device and the network device are reduced.

For example, the first uplink reference information may be an SRS. In an NR system, the SRS may be used to measure an uplink channel. In a time division duplex (TDD) system, downlink channel state information may be obtained by using reciprocity between uplink and downlink channels.

In some implementations, the communication method according to this embodiment of this disclosure may further include: The network device sends at least one piece of downlink information to the terminal device. Correspondingly, the terminal device receives the at least one piece of downlink information from the network device.

For example, the downlink information may be scheduled by using downlink control information (DCI) or transmitted through semi-persistent scheduling (SPS). The terminal device may decode the at least one piece of received downlink information, to obtain at least one piece of feedback information.

S202: The terminal device sends first channel state information or a first uplink reference signal to the network device when the first feedback information set meets a first condition. Correspondingly, the network device receives the first channel state information or the first uplink reference signal from the terminal device.

In some implementations, the first condition may be a condition that a characteristic of a NACK in the first feedback information set meets.

Optionally, the characteristic of the NACK may include a location of the NACK in the first feedback information set and/or a quantity of NACKs.

Optionally, the first condition may be predefined, and a specific condition/specific conditions included in the first condition may be predefined in a protocol.

For example, the characteristic of the NACK is the quantity of NACKs. The first condition may include one or more of the following conditions: A ratio of a quantity of NACKs in the first feedback information set to a quantity of ACKs in the first feedback information set is greater than or equal to a first threshold. The quantity of NACKs in the first feedback information set is greater than or equal to a second threshold. A quantity of consecutive NACKs in the first feedback information set is greater than or equal to a third threshold. A ratio of the quantity of NACKs in the first feedback information set to a total quantity of feedback information in the first feedback information set is greater than or equal to a fourth threshold.

The first threshold, the second threshold, the third threshold, and the fourth threshold may be preset or preconfigured. For example, the preset threshold may be specified in a protocol. For example, the preconfigured threshold may be determined by the network device and notified to the terminal device.

For example, in an example in which the characteristic of the NACK is the quantity of NACKs, a manner of determining whether the first feedback information set meets the first condition is as follows:

When the first condition includes one condition, if the first feedback information set meets the condition, it is determined that the first feedback information set meets the first condition; or if the first feedback information set does not meet the condition, it is determined that the first feedback information set does not meet the first condition.

When the first condition includes a plurality of conditions, a manner of determining whether the first feedback information set meets the first condition may include: In a first manner, when the first feedback information set meets any condition in the first condition, it may be determined that the first feedback information set meets the first condition; or when the first feedback information set meets none of the conditions in the first condition, it may be determined that the first feedback information set does not meet the first condition. Alternatively, in a second manner, when the first feedback information set meets all the conditions in the first condition, it is determined that the first feedback information set meets the first condition; or when the first feedback information set meets none of the conditions in the first condition, it may be determined that the first feedback information set does not meet the first condition.

The following is described by using an example in which the characteristic of the NACK is the quantity of NACKs and the first condition includes one condition.

For example, it is assumed that the first threshold is ⅓, and the first feedback information set is NAAAAN. The ratio of the quantity of NACKs in the first feedback information set to the quantity of ACKs in the first feedback information set is equal to ½, which is greater than the first threshold ⅓. In this case, the first feedback information set meets the first condition, and the terminal device may send the first channel state information or the first uplink reference signal to the network device.

For example, it is assumed that the second threshold is 3, and the first feedback information set is NAAAAN. The quantity of NACKs in the first feedback information set is equal to 2 and is less than the second threshold 3. In this case, the first feedback information set does not meet the first condition, and the terminal device does not send the first channel state information or the first uplink reference signal to the network device.

For example, it is assumed that the second threshold is 1. When the first feedback information set is NAAAAN, the quantity of NACKs in the first feedback information set is 2, which is greater than the second threshold. In this case, the first feedback information set meets the first condition, and the terminal device may send the first channel state information or the first uplink reference signal to the network device.

For example, when the first feedback information set is NAAAAN, the quantity of consecutive NACKs in the first feedback information set is 1. When the first feedback information set is NNAAAN, the quantity of consecutive NACKs in the first feedback information set is 2. It is assumed that the third threshold is 2, and the first feedback information set is NNAAAN. The quantity of consecutive NACKs in the first feedback information set is 2, which is equal to the third threshold 2. In this case, the first feedback information set meets the first condition, and the terminal device may send the first channel state information or the first uplink reference signal to the network device.

For example, it is assumed that the fourth threshold is ⅓, and the first feedback information set is NAAAAN. The ratio of the quantity of NACKs in the first feedback information set to the total quantity of feedback information in the first feedback information set is ⅔=⅓, which is equal to the fourth threshold ⅓. In this case, the first feedback information set meets the first condition, and the terminal device may send the first channel state information or the first uplink reference signal to the network device.

The following is described by using an example in which the characteristic of the NACK is the quantity of NACKs and the first condition includes a plurality of conditions.

For example, the first condition includes three conditions in the foregoing conditions. It is assumed that the first condition includes that the ratio of the quantity of NACKs in the first feedback information set to the quantity of ACKs in the first feedback information set is greater than or equal to the first threshold, the quantity of NACKs in the first feedback information set is greater than or equal to the second threshold, and the quantity of consecutive NACKs in the first feedback information set is greater than or equal to the third threshold.

When the first condition includes a plurality of conditions in the foregoing conditions, an example of determining, in the first manner, whether the first feedback information set meets the first condition is as follows:

For example, it is assumed that the first threshold is ⅓, the second threshold is 3, the third threshold is 2, and the first feedback information set is NAAAAN. The ratio of the quantity of NACKs in the first feedback information set to the quantity of ACKs in the first feedback information set is equal to ½, which is greater than the first threshold ⅓, the quantity of NACKs is equal to 2, and the quantity of consecutive NACKs is 1. In this case, the first feedback information set meets the first condition.

For example, it is assumed that the first threshold is ⅔, the second threshold is 4, the third threshold is 3, and the first feedback information set is NAAAAN. The ratio of the quantity of NACKs in the first feedback information set to the quantity of ACKs in the first feedback information set is equal to ½, the quantity of NACKs is equal to 2, and the quantity of consecutive NACKs is 1. In this case, the first feedback information set does not meet the first condition.

It should be noted that when it is determined that the first feedback information set meets one condition included in the first condition, whether another condition included in the first condition is met may not be determined. For example, if it has been determined that the quantity of NACKs in the first feedback information set is greater than or equal to the second threshold, whether the quantity of consecutive NACKs in the first feedback information set is greater than or equal to the third threshold may not be further determined, to save a signal processing procedure.

When the first condition includes a plurality of conditions in the foregoing conditions, an example of determining, in the second manner, whether the first feedback information set meets the first condition is as follows:

For example, it is assumed that the first threshold is ⅓, the second threshold is 3, the third threshold is 2, and the first feedback information set is NNAAAN. The ratio of the quantity of NACKs in the first feedback information set to the quantity of ACKs in the first feedback information set is equal to ½, which is greater than the first threshold ⅓, the quantity of NACKs is equal to 3, which is equal to the second threshold 3, and the quantity of consecutive NACKs is 2, which is equal to the third threshold 2. In this case, the first feedback information set meets the first condition.

For example, it is assumed that the first threshold is ⅓, the second threshold is 3, the third threshold is 2, and the first feedback information set is NAAAAN. The ratio of the quantity of NACKs in the first feedback information set to the quantity of ACKs in the first feedback information set is equal to ½, which is greater than the first threshold ⅓, the quantity of NACKs is equal to 2, and the quantity of consecutive NACKs is 1. In this case, the first feedback information set does not meet the first condition.

Optionally, when it has been determined that the first feedback information set does not meet any condition included in the first condition, whether another condition included in the first condition is met may not be determined. For example, if it has been determined that the quantity of NACKs in the first feedback information set is less than the second threshold, whether the quantity of consecutive NACKs in the first feedback information set is greater than or equal to the third threshold may not be further determined, to save a signal processing procedure.

The foregoing is merely examples provided in this embodiment of this disclosure, and examples in which the first feedback information set meets or does not meet the first condition are not listed one by one in this disclosure.

Optionally, a NACK in the first condition may be a valid NACK, and the quantity of NACKs may be a quantity of valid NACKs.

For example, the first condition may include one or more of the following conditions: A ratio of a quantity of valid NACKs in the first feedback information set to the quantity of ACKs in the first feedback information set is greater than or equal to the first threshold. The quantity of valid NACKs in the first feedback information set is greater than or equal to the second threshold. A quantity of consecutive valid NACKs in the first feedback information set is greater than or equal to the third threshold. A ratio of the quantity of valid NACKs in the first feedback information set to the total quantity of feedback information in the first feedback information set is greater than or equal to the fourth threshold.

Optionally, the valid NACK includes a NACK obtained after the downlink information is unsuccessfully decoded and a full NACK. The first feedback information set includes at least one valid NACK.

Alternatively, optionally, the valid NACK is the NACK obtained after the downlink information is unsuccessfully decoded, and the NACK in the first condition is the NACK obtained after the downlink information is unsuccessfully decoded. The first feedback information set includes at least one valid NACK.

For example, when it is determined whether the first feedback information set meets the first condition, only the NACK obtained after the downlink information is unsuccessfully decoded may be used as the valid NACK.

For example, the first condition includes that the quantity of consecutive NACKs in the first feedback information set is greater than or equal to the third threshold, and the first condition in which only the NACK obtained after the downlink information is unsuccessfully decoded is used as the valid NACK is used. It is assumed that the third threshold is 2, and the first feedback information set is NNNAAN. The first "N" and the second "N" are NACKs obtained after the downlink information is unsuccessfully decoded, and the third "N" and the sixth "N" are full NACKs. In this case, the quantity of consecutive NACKs in the first feedback information set is 2 (namely, the first "N" and the second "N"), which is equal to the third threshold 2. The first feedback information set meets the first condition.

For example, the first condition includes that the quantity of NACKs in the first feedback information set is greater than or equal to the second threshold, and the first condition in which only the NACK obtained after the downlink information is unsuccessfully decoded is used as the valid NACK is used. It is assumed that the second threshold is 3, the first feedback information set is NNAAAN, the first "N" and the second "N" are full NACKs, and the sixth "N" is the NACK obtained after the downlink information is unsuccessfully decoded. In this case, the quantity of NACKs in the first feedback information set is 1 (namely, the sixth "N"), which is less than the second threshold 3. The first feedback information set does not meet the first condition. The terminal device may not send the first channel state information or the first uplink reference signal to the network device, so that signaling overheads are reduced.

In this way, when it is determined whether the first feedback information set meets the first condition, only a NACK (the NACK obtained after the downlink information is unsuccessfully decoded) for which corresponding channel state information or a corresponding uplink reference signal needs to be fed back is calculated, and another NACK for which channel state information or an uplink reference signal does not need to be fed back is not calculated. The full NACK may be caused because the network device does not send the downlink information to the terminal device, and cannot indicate that an error occurs in current data transmission. Therefore, when it is determined whether the first condition is met, the full NACK is not considered, so that unnecessary overheads for sending the first channel state information or the first uplink reference signal can be further reduced, and an excessively large performance loss is not caused.

For example, when it is determined whether the first feedback information set meets the first condition, both the NACK obtained after the downlink information is unsuccessfully decoded and the full NACK may be used as the valid NACKs.

It is assumed that the second threshold and the first feedback information set are the same as those in the foregoing example (to be specific, the second threshold is 3, and the first feedback information set is NNAAAN, where the first "N" and the second "N" are the full NACKs, and the sixth "N" is the NACK obtained after the downlink information is unsuccessfully decoded). A difference is that the first condition in which both the NACK obtained after the downlink information is unsuccessfully decoded and the full NACK are used as the valid NACKs is used. In this case, the quantity of NACKs in the first feedback information set is 3, which is equal to the second threshold 3, and the first feedback information set meets the first condition, so that the terminal device sends the first channel state information or the first uplink reference signal to the network device.

In this embodiment of this disclosure, "unsuccessfully decode" and "incorrectly decode" may sometimes be interchangeably used. It should be noted that the expressed meanings of the "unsuccessfully decode" and the "incorrectly decode" are consistent when a difference between the "unsuccessfully decode" and the "incorrectly decode" is not emphasized. Sometimes, "successfully decode" and "correctly decode" may sometimes be interchangeably used. It should be noted that the expressed meanings of the "successfully decode" and the "correctly decode" are consistent when a difference between the "successfully decode" and the "correctly decode" is not emphasized.

In some other implementations, the first condition may include: The first feedback information set includes at least one piece of high-priority feedback information.

Optionally, the high-priority feedback information may correspond to an ultra-reliable and low-latency scenario (URLLC) service, and the URLLC service has a requirement for low latency and high reliability. The high-priority feedback information may include a high-priority NACK or a high-priority ACK, and the high-priority NACK or the high-priority ACK may indicate a decoding result of downlink information of a URLLC service type.

For example, the first feedback information set includes six pieces of feedback information. It is assumed that priorities of the first three pieces of feedback information are high, and priorities of the last three pieces of feedback information are low. In this case, the first feedback information set meets the first condition.

For example, the first feedback information set includes six pieces of feedback information. It is assumed that priorities of the six pieces of feedback information are high. In this case, the first feedback information set meets the first condition.

For example, the first feedback information set includes six pieces of feedback information. It is assumed that priorities of the six pieces of feedback information are low. In this case, the first feedback information set does not meet the first condition.

That is, when high-priority feedback information exists in the first feedback information set, the first feedback information set meets the first condition.

Optionally, the first condition includes: All feedback information included in the first feedback information set has a high priority.

For example, the first feedback information set includes six pieces of feedback information. It is assumed that priorities of the first three pieces of feedback information are high, and priorities of the last three pieces of feedback information are low. In this case, the first feedback information set does not meet the first condition.

For example, the first feedback information set includes six pieces of feedback information. It is assumed that priorities of the six pieces of feedback information are high. In this case, the first feedback information set meets the first condition.

In still some implementations, the first condition may include: The first feedback information set includes at least one piece of low-priority feedback information.

Optionally, the low-priority feedback information may correspond to an enhanced mobile broadband (eMBB) service, and the eMBB service has a low requirement on reliability and latency.

For example, the first feedback information set includes six pieces of feedback information. It is assumed that priorities of the first three pieces of feedback information are high, and priorities of the last three pieces of feedback information are low. In this case, the first feedback information set meets the first condition.

For example, the first feedback information set includes six pieces of feedback information. It is assumed that priorities of the six pieces of feedback information are high. In this case, the first feedback information set does not meet the first condition.

For example, the first feedback information set includes six pieces of feedback information. It is assumed that priorities of the six pieces of feedback information are low. In this case, the first feedback information set meets the first condition.

That is, when low-priority feedback information exists in the first feedback information set, the first feedback information meets the first condition.

Optionally, the first condition includes: All feedback information included in the first feedback information set has a low priority.

For example, the first feedback information set includes six pieces of feedback information. It is assumed that priorities of the first three pieces of feedback information are high, and priorities of the last three pieces of feedback information are low. In this case, the first feedback information set does not meet the first condition.

For example, the first feedback information set includes six pieces of feedback information. It is assumed that priorities of the six pieces of feedback information are low. In this case, the first feedback information set meets the first condition.

In still some implementations, the first condition may include a condition that the first feedback information set includes at least one piece of high-priority feedback information, and a condition that the characteristic of the NACK in the first feedback information set meets. Optionally, the characteristic of the NACK may include the location of the NACK in the first feedback information set and/or the quantity of NACKs.

For example, the characteristic of the NACK is the quantity of NACKs. The first condition may include: The first feedback information set includes at least one piece of high-priority feedback information, and the first feedback information set meets one or more of the following conditions: The ratio of the quantity of NACKs in the first feedback information set to the quantity of ACKs in the first feedback information set is greater than or equal to the first threshold. The quantity of NACKs in the first feedback information set is greater than or equal to the second threshold. The quantity of consecutive NACKs in the first feedback information set is greater than or equal to the third threshold. The ratio of the quantity of NACKs in the first feedback information set to the total quantity of feedback information in the first feedback information set is greater than or equal to the fourth threshold.

For example, in this embodiment of this disclosure, for a manner of determining whether the first feedback information set meets one or more of the foregoing conditions, refer to the foregoing manner of determining whether the first feedback information set meets the first condition by using an example in which the characteristic of the NACK is the quantity of NACKs. Details are not described herein again.

The following is described by using an example in which the first condition may include: The first feedback information set includes at least one piece of high-priority feedback information, and the first feedback information set meets that the quantity of NACKs in the first feedback information set is greater than or equal to the second threshold.

For example, the first feedback information set includes six pieces of feedback information, and the first feedback information set is NNAAAN. It is assumed that priorities of the first three pieces of feedback information are high, priorities of the last three pieces of feedback information are low, and the second threshold is 3. The quantity of NACKs in the first feedback information set is 3, which is equal to the second threshold 3, and the first feedback information set includes at least one piece of high-priority feedback information. In this case, the first feedback information set meets the first condition.

For example, the first feedback information set includes six pieces of feedback information, and the first feedback information set is NNAAAN. It is assumed that priorities of the six pieces of feedback information are high, and the second threshold is 3. The quantity of NACKs in the first feedback information set is 3, which is equal to the second threshold 3, and the first feedback information set includes at least one piece of high-priority feedback information. In this case, the first feedback information set meets the first condition.

For example, the first feedback information set includes six pieces of feedback information, and the first feedback information set is NNAAAN. It is assumed that priorities of the six pieces of feedback information are low, the second threshold is 3, and the first feedback information set does not include at least one piece of high-priority feedback information. In this case, the first feedback information set does not meet the first condition.

That is, the first feedback information set meets the first condition only when the first feedback information set meets both of the following conditions: The first feedback information set includes at least one piece of high-priority feedback information. The quantity of NACKs in the first feedback information set is greater than or equal to the second threshold.

Optionally, the first condition includes: All feedback information included in the first feedback information set has a high priority, and the first feedback information set meets one or more of the following conditions: The ratio of the quantity of NACKs in the first feedback information set to the quantity of ACKs in the first feedback information set is greater than or equal to the first threshold. The quantity of NACKs in the first feedback information set is greater than or equal to the second threshold. The quantity of consecutive NACKs in the first feedback information set is greater than or equal to the third threshold. The ratio of the quantity of NACKs in the first feedback information set to the total quantity of feedback information in the first feedback information set is greater than or equal to the fourth threshold.

The following is described by using an example in which the first condition includes: All feedback information included in the first feedback information set has a high priority, and the first feedback information set meets that the quantity of NACKs in the first feedback information set is greater than or equal to the second threshold.

For example, the first feedback information set includes six pieces of feedback information, and the first feedback information set is NNAAAN. It is assumed that priorities of the first three pieces of feedback information are high, priorities of the last three pieces of feedback information are low, and the second threshold is 3. Although the quantity of NACKs in the first feedback information set is 3, which is equal to the second threshold 3, a condition that all feedback information has a high priority is not met. In this case, the first feedback information set does not meet the first condition.

For example, the first feedback information set includes six pieces of feedback information, and the first feedback information set is NNAAAN. It is assumed that priorities of the six pieces of feedback information are high, and the second threshold is 3. The quantity of NACKs in the first feedback information set is 3, which is equal to the second threshold 3, and the condition that all feedback information has a high priority is met. In this case, the first feedback information set meets the first condition.

In still some implementations, the first condition may include a condition that the first feedback information set includes at least one piece of low-priority feedback information, and a condition that the characteristic of the NACK in the first feedback information set meets. Optionally, the characteristic of the NACK may include the location of the NACK in the first feedback information set and/or the quantity of NACKs.

For example, the characteristic of the NACK is the quantity of NACKs. The first condition may include: The first feedback information set includes at least one piece of low-priority feedback information, and the first feedback information set meets one or more of the following conditions: The ratio of the quantity of NACKs in the first feedback information set to the quantity of ACKs in the first feedback information set is greater than or equal to the first threshold. The quantity of NACKs in the first feedback information set is greater than or equal to the second threshold. The quantity of consecutive NACKs in the first feedback information set is greater than or equal to the third threshold. The ratio of the quantity of NACKs in the first feedback information set to the total quantity of feedback information in the first feedback information set is greater than or equal to the fourth threshold.

The following is described by using an example in which the first condition includes: The first feedback information set includes at least one piece of low-priority feedback information, and the first feedback information set meets that the quantity of NACKs in the first feedback information set is greater than or equal to the second threshold.

For example, the first feedback information set includes six pieces of feedback information, and the first feedback information set is NNAAAN. It is assumed that priorities of the first three pieces of feedback information are high, priorities of the last three pieces of feedback information are low, and the second threshold is 3. The quantity of NACKs in the first feedback information set is 3, which is equal to the second threshold 3, and the first feedback information set includes at least one piece of low-priority feedback information. In this case, the first feedback information set meets the first condition.

For example, the first feedback information set includes six pieces of feedback information, and the first feedback information set is NNAAAN. It is assumed that priorities of the six pieces of feedback information are high, the second threshold is 3, and the first feedback information set does not include at least one piece of low-priority feedback information. In this case, the first feedback information set does not meet the first condition.

For example, the first feedback information set includes six pieces of feedback information, and the first feedback information set is NNAAAN. It is assumed that priorities of the six pieces of feedback information are low, and the second threshold is 3. The quantity of NACKs in the first feedback information set is 3, which is equal to the second threshold 3, and the first feedback information set includes at least one piece of low-priority feedback information. In this case, the first feedback information set meets the first condition.

That is, the first feedback information set meets the first condition only when the first feedback information set meets both of the following conditions: The first feedback information set includes at least one piece of low-priority feedback information. The quantity of NACKs in the first feedback information set is greater than or equal to the second threshold.

Optionally, the first condition includes: All feedback information included in the first feedback information set has a low priority, and the first feedback information set meets one or more of the following conditions: The ratio of the quantity of NACKs in the first feedback information set to the quantity of ACKs in the first feedback information set is greater than or equal to the first threshold. The quantity of NACKs in the first feedback information set is greater than or equal to the second threshold. The quantity of consecutive NACKs in the first feedback information set is greater than or equal to the third threshold. The ratio of the quantity of NACKs in the first feedback information set to the total quantity of feedback information in the first feedback information set is greater than or equal to the fourth threshold.

The following is described by using an example in which the first condition includes: All feedback information included in the first feedback information set has a high priority, and the first feedback information set meets that the quantity of NACKs in the first feedback information set is greater than or equal to the second threshold.

For example, the first feedback information set includes six pieces of feedback information, and the first feedback information set is NNAAAN. It is assumed that priorities of the first three pieces of feedback information are high, priorities of the last three pieces of feedback information are low, and the second threshold is 3. Although the quantity of NACKs in the first feedback information set is 3, which is equal to the second threshold 3, a condition that all feedback information has a low priority is not met. In this case, the first feedback information set does not meet the first condition.

For example, the first feedback information set includes six pieces of feedback information, and the first feedback information set is NNAAAN. It is assumed that priorities of the six pieces of feedback information are low, and the second threshold is 3. The quantity of NACKs in the first feedback information set is 3, which is equal to the second threshold 3, and the condition that all feedback information has a low priority is met. In this case, the first feedback information set meets the first condition.

Optionally, a first condition met when the first feedback information set includes at least one piece of low-priority feedback information may be different from a first condition met when the first feedback information set includes at least one piece of high-priority feedback information.

For example, it is assumed that a second threshold corresponding to a first feedback information set 1 that includes only high-priority feedback information is 1. When a quantity of NACKs included in the first feedback information set 1 is 1, the first condition is met. It is assumed that a second threshold corresponding to a first feedback information set 2 that includes only low-priority feedback information is 3. When a quantity of NACKs included in the first feedback information set 2 is 1, the first condition is not met; and when the quantity of NACKs included in the first feedback information set is 3, the first condition is met.

That is, different first feedback information sets may determine, based on different first thresholds, and/or different second thresholds, and/or different third thresholds, and/or different fourth thresholds, whether the first condition is met. In addition, different first feedback information sets may alternatively correspond to different first conditions. For example, a first condition corresponding to a first feedback information set that includes at least one piece of high-priority feedback information is that a ratio of a quantity of NACKs in the first feedback information set to a quantity of ACKs in the first feedback information set is greater than or equal to a first threshold, and a first condition corresponding to a first feedback information set first feedback information set that includes at least one piece of low-priority feedback information is that a quantity of NACKs in the first feedback information set is greater than or equal to a second threshold. The different first feedback information sets may mean that priorities of feedback information included in the first feedback information sets are different.

In a possible implementation, the first channel state information or the first uplink reference signal may be configured based on first configuration information, and a first feedback information set corresponding to the first configuration information includes at least one piece of high-priority feedback information.

Optionally, the first channel state information or the first uplink reference signal corresponds to a first feedback information set including at least one piece of high-priority feedback information. For example, the network device may determine the first configuration information based on the first feedback information set including at least one piece of high-priority feedback information. The terminal device may determine the first channel state information or the first uplink reference signal based on the first configuration information. The first channel state information or the first uplink reference signal is triggered by the first feedback information set including at least one piece of high-priority feedback information. The triggering may mean that if the first feedback information set meets the first condition, the terminal device sends the first channel state information or the first uplink reference signal. The first channel state information or the first uplink reference signal is triggered by the first feedback information set.

For example, it may be determined, in the following manner, that the first feedback information set corresponding to the first configuration information includes at least one piece of high-priority feedback information.

For example, the first configuration information includes first information, and the first information is associated with the first channel state information or the first uplink reference signal.

Optionally, the first information indicates a priority. The first information may indicate a high priority or a low priority. For example, the first information indicates a high priority. In this case, the first feedback information set corresponding to the first configuration information includes at least one piece of high-priority feedback information. The first channel state information or the first uplink reference signal triggered by the first feedback information set including at least one piece of high-priority feedback information is configured based on the first configuration information.

Alternatively, optionally, the first information is indication information of a CQI table in a CSI report configuration, and the CQI table may be used to calculate a CQI. For example, the first information indicates that a transport block error rate (BLER) corresponding to the CQI table in the CSI report configuration is $10^{-5}$. In this case, the first feedback information set corresponding to the first configuration information includes at least one piece of high-priority feedback information.

Optionally, the first configuration information is configuration information related to the first channel state information or the first uplink reference signal. For example, the first configuration information may include the foregoing CSI resource configuration (CSI-ResourceConfig) and/or CSI report configuration (CSI-ReportConfig). The first channel state information may be configured based on the first configuration information.

Optionally, the first channel state information or the first uplink reference signal triggered by the first feedback information set including at least one piece of high-priority feedback information is configured based on the first configuration information. Specifically, it may mean that the terminal device determines the first channel state information or the first uplink reference signal based on the first configuration information.

The first channel state information is used as an example. The terminal device determines, based on the first configuration information, content included in the first channel state information, including one or more of a CRI, an RI, a PMI, and a CQI. Alternatively, the terminal device determines, based on the first configuration information, that the first channel state information is a wideband feedback or a narrowband feedback. Alternatively, the terminal device determines, based on the first configuration information, a time-frequency resource used to measure the first channel state information. Alternatively, the terminal device determines, based on the first configuration information, a time-frequency resource for reporting the first channel state information. Alternatively, the terminal device determines, based on the first configuration information, a type of a time-frequency resource for measuring the first channel state information.

For example, the first feedback information set is NAAAAN, the first feedback information set includes six pieces of feedback information, and it is assumed that priorities of the six pieces of feedback information are high. The first configuration information corresponding to the first feedback information set may include: A report configuration type is P-CSI. A report quantity includes a CRI, a PMI, and a CQI. Configuration information of a type of a resource for measuring the first channel state information may be a periodic resource.

For example, the first feedback information set is NNAAAN, the first feedback information set includes six pieces of feedback information, it is assumed that priorities of the six pieces of feedback information are high, and a quantity of NACKs is 3, which is greater than a second threshold 2. The first configuration information corresponding to the first feedback information set may include: A report configuration type is SP-CSI. A report quantity includes a CRI, an RI, a PMI, and a CQI. Configuration information of a type of a resource may be a semi-persistent resource. Optionally, the first feedback information set corresponding to the first configuration information includes at least one piece of high-priority feedback information and meets one or more of the first threshold, the second threshold, the third threshold, and the fourth threshold.

In this way, the terminal device may send different first channel state information or first uplink reference signals to the network device based on different first feedback information sets, for example, different priorities of feedback information included in the first feedback information sets, to meet diversified requirements of different services.

In another possible implementation, the first channel state information or the first uplink reference signal may be configured based on second configuration information, and a first feedback information set corresponding to the second configuration information includes at least one piece of low-priority feedback information.

Optionally, the first channel state information or the first uplink reference signal corresponds to a first feedback information set including at least one piece of low-priority feedback information. For example, the network device may determine the second configuration information based on the first feedback information set including at least one piece of low-priority feedback information. The terminal device may determine the first channel state information or the first uplink reference signal based on the second configuration information. The first channel state information or the first uplink reference signal is triggered by the first feedback information set including at least one piece of low-priority feedback information. The triggering means that if the first feedback information set meets the first condition, the terminal device sends the first channel state information or the first uplink reference signal. In other words, the first channel state information or the first uplink reference signal is triggered based on the first feedback information set.

For example, it may be determined, in the following manner, that the first feedback information set corresponding to the second configuration information includes at least one piece of low-priority feedback information.

For example, the second configuration information includes second information, and the second information is associated with the first channel state information or the first uplink reference signal.

Optionally, the second information indicates a priority. The second information may indicate a high priority or a low priority. For example, the second configuration information does not include second information indicating a high priority, or the second information includes second information indicating a low priority. In this case, the first feedback information set corresponding to the second configuration information includes at least one piece of low-priority feedback information. The first channel state information or the first uplink reference signal triggered by the first feedback information set including at least one piece of low-priority feedback information is configured based on the second configuration information.

Optionally, the second information is indication information of a CQI table in a CSI report configuration. For example, the second information indicates that a BLER corresponding to the CQI table in the CSI report configuration is $10^{-1}$. In this case, the first feedback information set corresponding to the first configuration information includes at least one piece of low-priority feedback information.

Optionally, the second configuration information is similar to the first configuration information, the second configuration information is configuration information related to the first channel state information or the first uplink reference signal, and the reference signal may include a CSI-RS and/or an SRS. For example, the second configuration information includes the foregoing CSI resource configuration (CSI-ResourceConfig) and/or CSI report configuration (CSI-ReportConfig). The first channel state information may be configured based on the second configuration information.

Optionally, the first channel state information or the first uplink reference signal triggered by the first feedback information set including at least one piece of low-priority feedback information is configured based on the second configuration information. Specifically, it may mean that the terminal device determines the first channel state information or the first uplink reference signal based on the second configuration information. For a specific implementation, refer to the foregoing implementation in which the terminal device determines the first channel state information or the first uplink reference signal based on the first configuration information. Details are not described herein again.

For example, the first feedback information set is NNAAAN, the first feedback information set includes six pieces of feedback information, and it is assumed that priorities of the six pieces of feedback information are low. The second configuration information corresponding to the first feedback information set may include: A report configuration type is A-CSI. A report quantity includes a CRI, a PMI, and a CQI. Configuration information of a type of a resource may be an aperiodic resource.

For another example, the first feedback information set is NNAAAN, the first feedback information set includes six pieces of feedback information, it is assumed that priorities of the six pieces of feedback information are low, and a quantity of NACKs is 3, which is greater than a second threshold 2. The second configuration information corresponding to the first feedback information set may include: A report configuration type is P-CSI. A report quantity includes a CRI, an RI, a PMI, and a CQI. Configuration information of a type of a resource may be a semi-persistent resource. In other words, the first feedback information set corresponding to the second configuration information may include at least one piece of low-priority feedback information and meet one or more of the first threshold, the second threshold, the third threshold, and the fourth threshold.

For example, the second configuration information may be different from the first configuration information. The first channel state information determined based on the first configuration information is different from the first channel state information determined based on the second configuration information. For example, report content is different, or time-frequency resources used to report the first channel state information are different, or time-frequency resources used to measure the first channel state information are different.

In other words, when the first feedback information sets are different, the terminal device may send different first channel state information or first uplink reference signals to the network device. For example, a report moment of the first channel state information, content of the first channel state information, and a resource used to measure CSI may be independently configured.

In this way, a service corresponding to the first feedback information set including high-priority feedback information and a service corresponding to the first feedback information set including low-priority feedback information may have different requirements. Different configuration information, for example, the first configuration information and the second configuration information, is correspondingly configured for the two services, so that different first channel state information or first uplink reference signals may be reported for different services. This can meet diversified requirements of the different services.

Optionally, the communication method according to this embodiment of this disclosure further includes: The network device sends the first configuration information or the second configuration information to the terminal device. Correspondingly, the terminal device receives the first configuration information or the second configuration information from the network device.

In some implementations, the communication method according to this embodiment of this disclosure may further include: The terminal device sends the first feedback information set to the network device. Correspondingly, the network device receives the first feedback information set from the terminal device.

Optionally, when the terminal device does not send the first feedback information set to the network device, sending of the first channel state information or the first uplink reference signal may be muted. Correspondingly, when the network device does not receive the first feedback information set from the terminal device, receiving of the first channel state information or the first uplink reference signal is muted.

The muting may mean not performing one or more actions, or canceling one or more actions.

For example, it is assumed that the first feedback information set is NNAAAN, the first feedback information set includes six pieces of feedback information, and priorities of the six pieces of feedback information are low. If the terminal device does not send the first feedback information set to the network device, or sending of the first feedback information set is canceled, the sending of the first channel state information or the first uplink reference signal may be canceled, or the first channel state information or the first uplink reference signal is not sent, to reduce signaling overheads. If the first channel state information or the first uplink reference signal is still sent to the network device, because the network device does not receive the first feedback information set, even if the network device receives the first channel state information or the first uplink reference signal, the network device possibly cannot obtain information about a terminal device to which the first channel state information or the first uplink reference signal belongs. Consequently, data cannot be accurately scheduled for the terminal device for transmission, and signaling overheads are wasted.

Based on the communication method in FIG. 2, the terminal device determines the first feedback information set, determines, based on the first feedback information set, whether to send the first channel state information or the first uplink reference signal to the network device, and sends the first channel state information or the first uplink reference signal to the network device when the first feedback information set meets the first condition. In this way, the terminal device may determine, based on the first feedback information set, whether to send channel state information or an uplink reference signal, and does not need to frequently send the channel state information or the uplink reference signal, so that signaling overheads are reduced. In addition, the network device can be prevented from triggering measurement of a channel and sending of the channel state information, and latency in obtaining the channel state information or the uplink reference signal by the network device can be shortened, so that a requirement of a low-latency service is met.

Figure 4:
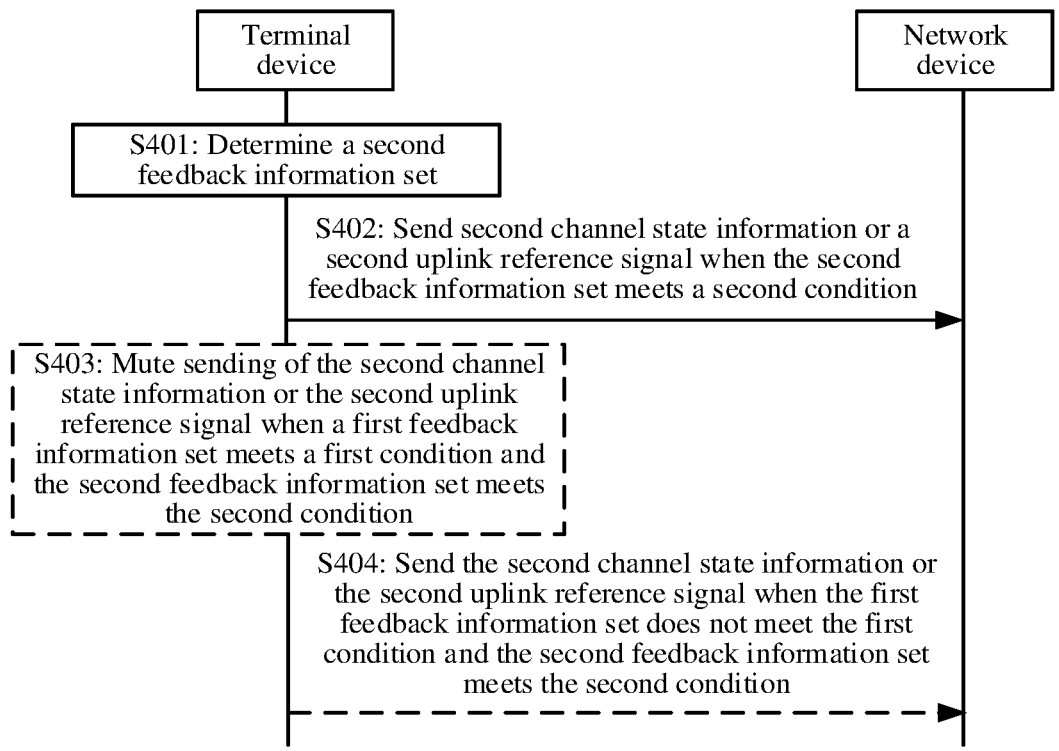
FIG. 4 is a schematic flowchart 2 of a communication method according to an embodiment of this disclosure.

FIG. 4 is a schematic flowchart 2 of a communication method according to an embodiment of this disclosure. When a plurality of feedback information sets, such as a first feedback information set and a second feedback information set, are transmitted on a same channel, the communication method according to this embodiment of this disclosure may further include the following S401 to S404 based on the foregoing S201 to S202. A sequence of S201 to S202 and S401 to S404 is not limited in this embodiment of this disclosure. Some or all of S401 to S404 may be performed before S201, after S202, or between S201 and S202.

In a possible implementation, the first feedback information set includes at least one piece of high-priority feedback information. The communication method according to this embodiment of this disclosure may further include: S401: A terminal device determines the second feedback information set.

Optionally, the second feedback information set includes at least one piece of low-priority feedback information, and the second feedback information set and the first feedback information set may be transmitted on the same channel.

For example, it is assumed that the first feedback information set includes six pieces of feedback information, and priorities of the six pieces of feedback information are high. It is assumed that the second feedback information set includes six pieces of feedback information, and priorities of the six pieces of feedback information are low. Optionally, a time domain resource corresponding to the first feedback information set may partially or completely overlap a time domain resource corresponding to the second feedback information set. Optionally, that time-frequency resources may partially or completely overlap indicates that a time-frequency resource corresponding to the first feedback information set is partially or completely the same as a time-frequency resource corresponding to the second feedback information set.

Optionally, the second feedback information set includes at least one valid NACK. The valid NACK includes a NACK obtained after downlink information is unsuccessfully decoded and a full NACK. Alternatively, the valid NACK is a NACK obtained after the downlink information is unsuccessfully decoded.

In some implementations, the communication method according to this embodiment of this disclosure may further include: S402: The terminal device may send second channel state information or a second uplink reference signal to a network device when the second feedback information set meets a second condition. Correspondingly, the network device receives the second channel state information or the second uplink reference signal from the terminal device.

In some implementations, the second condition may be a condition that a characteristic of a NACK in the second feedback information set meets.

Optionally, the characteristic of the NACK may include a location of the NACK in the second feedback information set and/or a quantity of NACKs.

Optionally, the second condition may be predefined, and a specific condition/specific conditions included in the second condition may be predefined in a protocol.

For example, the characteristic of the NACK is the quantity of NACKs. The second condition includes one or more of the following conditions: A ratio of a quantity of NACKs in the second feedback information set to a quantity of ACKs in the second feedback information set is greater than or equal to a fifth threshold. The quantity of NACKs in the second feedback information set is greater than or equal to a sixth threshold. A quantity of consecutive NACKs in the second feedback information set is greater than or equal to a seventh threshold. A ratio of the quantity of NACKs in the second feedback information set to a total quantity of feedback information in the second feedback information set is greater than or equal to an eighth threshold.

The fifth threshold, the sixth threshold, the seventh threshold, and the eighth threshold may be preset or preconfigured. A specific implementation of the second condition is similar to an implementation of the first condition. A specific implementation of whether the second feedback information set meets the second condition is similar to an implementation of whether the first feedback information set meets the corresponding first condition. For details, refer to S202. Details are not described herein again.

For example, in this embodiment of this disclosure, for a manner of determining whether the second feedback information set meets one or more of the foregoing conditions, refer to the foregoing manner of determining whether the first feedback information set meets the first condition by using an example in which the characteristic of the NACK is the quantity of NACKs. Details are not described herein again.

It should be noted that values of the first threshold to the eighth threshold are not limited in this embodiment of this disclosure. The fifth threshold may be the same as or different from the first threshold. The second threshold may be the same as the sixth threshold, the third threshold may be the same as the seventh threshold, and the fourth threshold may be the same as the eighth threshold.

In some other implementations, the communication method according to this embodiment of this disclosure may further include: S403: Mute sending of the second channel state information or the second uplink reference signal when the first feedback information set meets the first condition and the second feedback information set meets the second condition. Correspondingly, the network device mutes receiving of the second channel state information or the second uplink reference signal.

For example, a sequence of S403 and S202 is not limited in this disclosure. When the first feedback information set meets the first condition and the second feedback information set meets the second condition, first channel state information or a first uplink reference signal may be sent to the network device, and the sending of the second channel state information or the second uplink reference signal is canceled, or the second channel state information or the second uplink reference signal is not sent. The network device cancels the receiving of the second channel state information or the second uplink reference signal, or does not receive the second channel state information or the second uplink reference signal, to reduce signaling overheads.

In addition, when the terminal device has determined that the first feedback information set meets the first condition, the terminal device may no longer determine whether the second feedback information set meets the second condition, to further reduce a processing procedure of the terminal device, and reduce processing resources and power of the terminal device.

In still some implementations, the communication method according to this embodiment of this disclosure may further include: S404: The terminal device may send the second channel state information or the second uplink reference signal to the network device when the first feedback information set does not meet the first condition and the second feedback information set meets the second condition. Correspondingly, the network device receives the second channel state information or the second uplink reference signal from the terminal device.

It should be noted that the terminal device may perform S402, S403, or S404 based on whether the first feedback information set meets the first condition and/or whether the second feedback information set meets the second condition.

For example, a sequence of S403 and S202 is not limited in this disclosure. When the first feedback information set does not meet the first condition and the second feedback information set meets the second condition, the terminal device may send the second channel state information or the second uplink reference signal to the network device, and does not send the first channel state information or the first uplink reference signal to the network device.

In some implementations, the communication method according to this embodiment of this disclosure may further include: The terminal device sends the second feedback information set to the network device. Correspondingly, the network device receives the second feedback information set from the terminal device.

Optionally, when the terminal device does not send the second feedback information set to the network device, the sending of the second channel state information or the second uplink reference signal may be muted. Correspondingly, the network device mutes the receiving of the second channel state information or the second uplink reference signal.

In other words, when the second feedback information set and the first feedback information set including at least one piece of high-priority feedback information are transmitted on a same channel, if the terminal device does not send the second feedback information set to the network device, or sending of the second feedback information set is canceled, the sending of the second channel state information or the second uplink reference signal may be canceled, or the second channel state information or the second uplink reference signal is not sent. The network device cancels the receiving of the second channel state information or the second uplink reference signal, or does not receive the second channel state information or the second uplink reference signal, to reduce signaling overheads. If the second channel state information or the second uplink reference signal is still sent to the network device, because the network device does not receive the second feedback information set, even if the network device receives the second channel state information or the second uplink reference signal, the network device possibly cannot obtain information about a terminal device to which the second channel state information or the second uplink reference signal belongs. Consequently, data cannot be accurately scheduled for the terminal device for transmission, and signaling overheads are wasted.

Based on the communication method shown in FIG. 4, when a plurality of feedback information sets are transmitted on a same channel, the terminal device may determine, based on whether the first feedback information set meets the first condition and/or whether the second feedback information set meets the second condition, to send the first channel state information or the first uplink reference signal to the network device, or send the second channel state information or the second uplink reference signal to the network device, to reduce signaling overheads.

The foregoing describes in detail the communication methods according to embodiments of this disclosure with reference to FIG. 2 to FIG. 4. The following describes in detail communication apparatuses according to embodiments of this disclosure with reference to FIG. 5 to FIG. 7.

Figure 5:
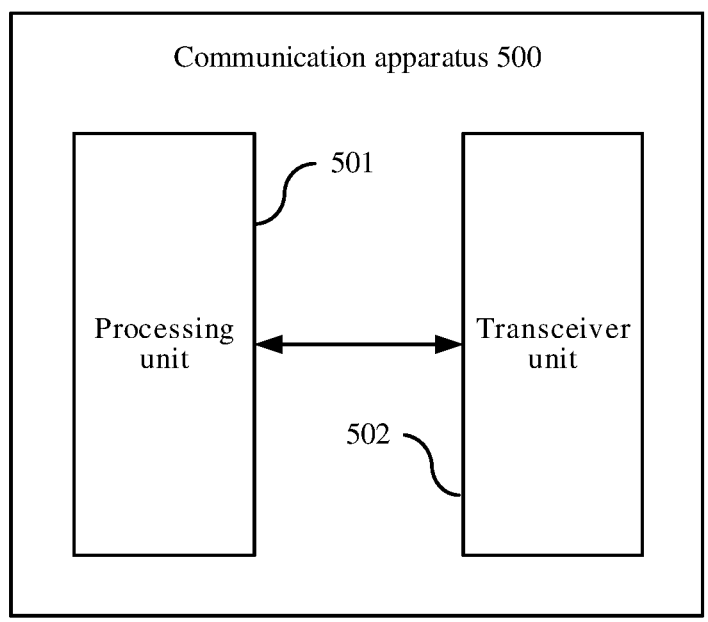
FIG. 5 is a schematic diagram 1 of a structure of a communication apparatus according to an embodiment of this disclosure.

FIG. 5 is a schematic diagram 1 of a structure of a communication apparatus according to an embodiment of this disclosure. The communication apparatus is applicable to the communication system shown in FIG. 1, and performs functions of the terminal device in the communication methods shown in FIG. 2 and FIG. 4. For ease of description, FIG. 5 shows only main components of the communication apparatus.

As shown in FIG. 5, a communication apparatus 500 includes: a processing unit 501 and a transceiver unit 502.

The processing unit 501 is configured to determine a first feedback information set. The first feedback information set includes at least one piece of feedback information, and the feedback information is a negative acknowledgment NACK or an acknowledgment ACK. The transceiver unit 502 is configured to send first channel state information or a first uplink reference signal to a network device when the first feedback information set meets a first condition.

In a possible implementation, the first condition may be a condition that a characteristic of a NACK in the first feedback information set meets. Optionally, the characteristic of the NACK may include a location of the NACK in the first feedback information set and/or a quantity of NACKs.

In a possible implementation, the first condition may include one or more of the following: A ratio of a quantity of NACKs in the first feedback information set to a quantity of ACKs in the first feedback information set is greater than or equal to a first threshold. The quantity of NACKs in the first feedback information set is greater than or equal to a second threshold. A quantity of consecutive NACKs in the first feedback information set is greater than or equal to a third threshold. A ratio of the quantity of NACKs in the first feedback information set to a total quantity of feedback information in the first feedback information set is greater than or equal to a fourth threshold.

In a possible implementation, the first condition may include: The first feedback information set includes at least one piece of high-priority feedback information.

In a possible implementation, the first condition may include: The first feedback information set includes at least one piece of low-priority feedback information.

In a possible implementation, the first channel state information or the first uplink reference signal may be configured based on first configuration information, and a first feedback information set corresponding to the first configuration information may include at least one piece of high-priority feedback information.

In a possible implementation, the first channel state information or the first uplink reference signal may be configured based on second configuration information, and a first feedback information set corresponding to the second configuration information may include at least one piece of low-priority feedback information.

In a possible implementation, the processing unit 501 may be further configured to mute sending of the first channel state information or the first uplink reference signal when the first feedback information set is not sent to the network device.

In a possible implementation, the first feedback information set may include at least one piece of high-priority feedback information. The processing unit 501 may be further configured to determine a second feedback information set. The second feedback information set may include at least one piece of low-priority feedback information, and the second feedback information set and the first feedback information set may be transmitted on a same channel.

In a possible implementation, the transceiver unit 502 may be further configured to send second channel state information or a second uplink reference signal to the network device when the second feedback information set meets a second condition. Alternatively, the processing unit 501 may be further configured to mute sending of the second channel state information or the second uplink reference signal when the first feedback information set meets the first condition and the second feedback information set meets the second condition. Alternatively, the transceiver unit 502 may be further configured to send the second channel state information or the second uplink reference signal to the network device when the first feedback information set does not meet the first condition and the second feedback information set meets the second condition.

Optionally, the second condition is a condition that a characteristic of a NACK in the second feedback information set meets. Optionally, the characteristic of the NACK may include a location of the NACK in the second feedback information set and/or a quantity of NACKs.

Optionally, the second condition includes one or more of the following: A ratio of a quantity of NACKs in the second feedback information set to a quantity of ACKs in the second feedback information set is greater than or equal to a fifth threshold. The quantity of NACKs in the second feedback information set is greater than or equal to a sixth threshold. A quantity of consecutive NACKs in the second feedback information set is greater than or equal to a seventh threshold. A ratio of the quantity of NACKs in the second feedback information set to a total quantity of feedback information in the second feedback information set is greater than or equal to an eighth threshold.

Optionally, the NACK is a NACK obtained after downlink information is unsuccessfully decoded.

Optionally, the first feedback information set includes at least two pieces of feedback information.

It should be noted that the transceiver unit 502 may include a receiving unit and a sending unit (not shown in FIG. 5). The receiving unit is configured to receive data from the network device, and the sending unit is configured to send data to the network device. A specific implementation of the transceiver unit 502 is not specifically limited in this disclosure.

Optionally, the communication apparatus 500 may further include a storage unit (not shown in FIG. 5), and the storage unit stores a program or instructions. When the processing unit executes the program or the instructions, the communication apparatus 500 is enabled to perform functions of the terminal device in the communication methods shown in FIG. 2 and FIG. 4.

It should be noted that the communication apparatus 500 may be a terminal device, or may be a component or a combined component in the terminal device, or may be a chip or a chip system disposed in the terminal device. This is not limited in this disclosure.

In addition, for technical effects of the communication apparatus 500, refer to technical effects of the communication methods shown in FIG. 2 and FIG. 4. Details are not described herein again.

Figure 6:
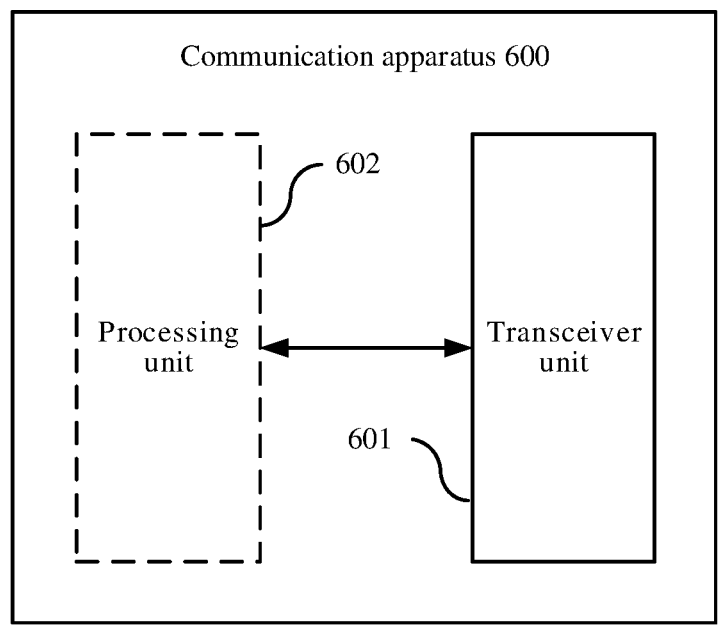
FIG. 6 is a schematic diagram 2 of a structure of a communication apparatus according to an embodiment of this disclosure.

FIG. 6 is a schematic diagram 2 of a structure of a communication apparatus according to an embodiment of this disclosure. The communication apparatus is applicable to the communication system shown in FIG. 1, and performs functions of the network device in the communication methods shown in FIG. 2 and FIG. 4. For ease of description, FIG. 6 shows only main components of the communication apparatus.

As shown in FIG. 6, a communication apparatus 600 includes a transceiver unit 601.

The transceiver unit 601 is configured to receive a first feedback information set from a terminal device. The first feedback information set includes at least one piece of feedback information, the feedback information is a negative acknowledgment NACK or an acknowledgment ACK, and the first feedback information set meets a first condition.

The transceiver unit 601 is further configured to receive first channel state information or a first uplink reference signal from the terminal device.

In a possible implementation, the first condition may be a condition that a characteristic of a NACK in the first feedback information set meets. Optionally, the characteristic of the NACK may include a location of the NACK in the first feedback information set and/or a quantity of NACKs.

In a possible implementation, the first condition may include one or more of the following: A ratio of a quantity of NACKs in the first feedback information set to a quantity of ACKs in the first feedback information set is greater than or equal to a first threshold. The quantity of NACKs in the first feedback information set is greater than or equal to a second threshold. A quantity of consecutive NACKs in the first feedback information set is greater than or equal to a third threshold. A ratio of the quantity of NACKs in the first feedback information set to a total quantity of feedback information in the first feedback information set is greater than or equal to a fourth threshold.

In a possible implementation, the first condition may include: The first feedback information set includes at least one piece of high-priority feedback information.

In a possible implementation, the first condition may include: The first feedback information set includes at least one piece of low-priority feedback information.

In a possible implementation, the first channel state information or the first uplink reference signal may be configured based on first configuration information, and a first feedback information set corresponding to the first configuration information may include at least one piece of high-priority feedback information.

In a possible implementation, the first channel state information or the first uplink reference signal may be configured based on second configuration information, and a first feedback information set corresponding to the second configuration information may include at least one piece of low-priority feedback information.

In a possible implementation, the transceiver unit 601 may be further configured to mute receiving of the first channel state information or the first uplink reference signal when the first feedback information set from the terminal device is not received.

In a possible implementation, the first feedback information set may include at least one piece of high-priority feedback information. The transceiver unit 601 may be further configured to receive a second feedback information set from the terminal device. The second feedback information set includes at least one piece of low-priority feedback information, and the second feedback information set and the first feedback information set are transmitted on a same channel.

In a possible implementation, the transceiver unit 601 may be further configured to receive second channel state information or a second uplink reference signal from the terminal device. The second feedback information set meets a second condition, or the first feedback information set does not meet the first condition and the second feedback information set meets the second condition. Alternatively, the transceiver unit 601 may be further configured to mute receiving of the second channel state information or the second uplink reference signal. The first feedback information set meets the first condition and the second feedback information set meets the second condition.

Optionally, the second condition is a condition that a characteristic of a NACK in the second feedback information set meets. Optionally, the characteristic of the NACK may include a location of the NACK in the second feedback information set and/or a quantity of NACKs.

Optionally, the second feedback information set meets the second condition, or the first feedback information set does not meet the first condition and the second feedback information set meets the second condition. The second condition may include one or more of the following: A ratio of a quantity of NACKs in the second feedback information set to a quantity of ACKs in the second feedback information set is greater than or equal to a fifth threshold. The quantity of NACKs in the second feedback information set is greater than or equal to a sixth threshold. A quantity of consecutive NACKs in the second feedback information set is greater than or equal to a seventh threshold. A ratio of the quantity of NACKs in the second feedback information set to a total quantity of feedback information in the second feedback information set is greater than or equal to an eighth threshold.

Optionally, the NACK is a NACK obtained after the terminal device unsuccessfully decodes downlink information.

Optionally, the first feedback information set includes at least two pieces of feedback information.

It should be noted that the transceiver unit 601 may include a receiving unit and a sending unit (not shown in FIG. 6). The receiving unit is configured to receive data or signaling from the terminal device, and the sending unit is configured to send data or signaling to the terminal device. A specific implementation of the transceiver unit 601 is not specifically limited in this disclosure.

Optionally, the communication apparatus 600 may further include a processing module 602 and a storage module (not shown in FIG. 6). The storage module stores a program or instructions. When the processing module 602 executes the program or the instructions, the communication apparatus 600 is enabled to perform functions of the terminal device in the communication methods shown in FIG. 2 and FIG. 4.

It should be noted that the communication apparatus 600 may be a network device, or may be a component or a combined component in the network device, or may be a chip or a chip system disposed in the network device. This is not limited in this disclosure.

In addition, for technical effects of the communication apparatus 600, refer to technical effects of the communication methods shown in FIG. 2 and FIG. 4. Details are not described herein again.

Figure 7:
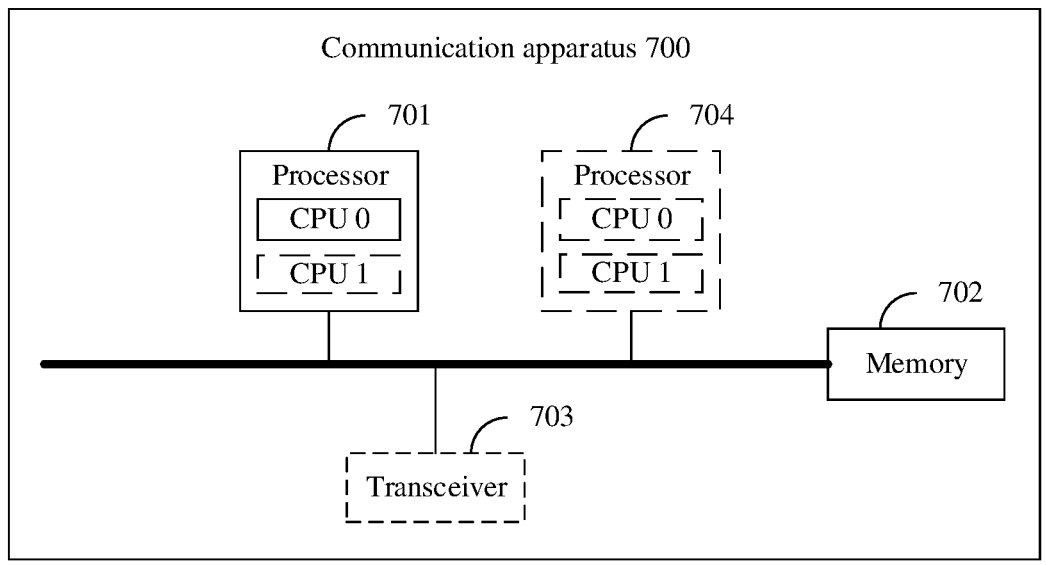
FIG. 7 is a schematic diagram 3 of a structure of a communication apparatus according to an embodiment of this disclosure.

FIG. 7 is a schematic diagram 3 of a structure of a communication apparatus according to an embodiment of this disclosure. The communication apparatus is applicable to the communication system shown in FIG. 1, and performs functions of the terminal device or the network device in the communication methods shown in FIG. 2 and FIG. 4.

A communication apparatus 700 may be a terminal device, a chip used in the terminal device, or another component having a function of the terminal device. Alternatively, the communication apparatus 700 may be a network device, a chip used in the network device, or another component having a function of the network device. As shown in FIG. 7, the communication apparatus 700 may include a processor 701, a memory 702, and a transceiver 703. The processor 701 is coupled to the memory 702 and the transceiver 703, for example, may be connected to the memory 702 and the transceiver 703 through a communication bus.

The following describes each component of the communication apparatus 700 in detail with reference to FIG. 7.

The processor 701 is a control center of the communication apparatus 700, and may be one processor, or may be a collective term of a plurality of processing elements. For example, the processor 701 is one or more central processing units (CPUs), or may be an application-specific integrated circuit (ASIC), or may be one or more integrated circuits configured to implement embodiments of this disclosure, for example, one or more microprocessors (digital signal processors, DSPs), or one or more field programmable gate arrays (FPGAs).

The processor 701 may perform various functions of the communication apparatus 700 by running or executing a software program stored in the memory 702 and invoking data stored in the memory 702.

During specific implementation, in an embodiment, the processor 701 may include one or more CPUs, such as a CPU 0 and a CPU 1 shown in FIG. 7.

During specific implementation, in an embodiment, the communication apparatus 700 may alternatively include a plurality of processors, for example, the processor 701 and a processor 704 shown in FIG. 7. Each of the processors may be a single-core processor (single-CPU) or a multi-core processor (multi-CPU). The processor herein may be one or more communication devices, circuits, and/or processing cores configured to process data (for example, computer program instructions).

The memory 702 may be a read-only memory (ROM), another type of static storage communication device capable of storing static information and instructions, a random access memory (RAM), or another type of dynamic storage communication device capable of storing information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium, another magnetic storage communication device, or any other medium capable of carrying or storing expected program code in a form of instructions or data structures and capable of being accessed by a computer, but is not limited thereto. The memory 702 may be integrated with the processor 701, or may exist independently, and is coupled to the processor 701 through an input/output port (not shown in FIG. 7) of the communication apparatus 700. This is not specifically limited in this embodiment of this disclosure.

The memory 702 is configured to store a software program for executing the solutions in this disclosure, and the processor 701 controls execution. For a specific implementation, refer to the foregoing method embodiments. Details are not described herein again.

Optionally, the transceiver 703 is configured to communicate with another communication apparatus. For example, the communication apparatus 700 is a terminal device, and the transceiver 703 may be configured to communicate with a network device. For another example, the communication apparatus 700 is a network device, and the transceiver 703 may be configured to communicate with a terminal device. In addition, the transceiver 703 may include a receiver and a transmitter (not separately shown in FIG. 7). The receiver is configured to implement a receiving function, and the transmitter is configured to implement a sending function. The transceiver 703 may be integrated with the processor 701, or may exist independently, and is coupled to the processor 701 through an input/output port (not shown in FIG. 7) of the communication apparatus 700. This is not specifically limited in this embodiment of this disclosure.

It should be noted that the structure of the communication apparatus 700 shown in FIG. 7 does not constitute a limitation on the communication apparatus. An actual communication apparatus may include more or fewer components than those shown in the figure, combine some components, or have different component arrangement.

In addition, for technical effects of the communication apparatus 700 shown in FIG. 7, refer to technical effects of the communication methods shown in FIG. 2 and FIG. 4. Details are not described herein again.

An embodiment of this disclosure provides a chip system. The chip system includes a processor and an input/output port. The processor is configured to implement a processing function in the foregoing method embodiments, and the input/output port is configured to implement sending and receiving functions in the foregoing method embodiments.

In a possible design, the chip system further includes a memory. The memory is configured to store program instructions and data for implementing functions in the foregoing method embodiments.

The chip system may include a chip, or may include a chip and another discrete component.

An embodiment of this disclosure provides a communication system. The system includes a network device and a terminal device.

An embodiment of this disclosure provides a computer-readable storage medium. The computer-readable storage medium stores computer instructions. When the computer instructions are run on a computer, the computer is enabled to perform the communication method in the foregoing method embodiments.

An embodiment of this disclosure provides a computer program product including instructions. The computer program product includes a computer program or the instructions. When the computer program or the instructions is/are run on a computer, the computer is enabled to perform the communication method in the foregoing method embodiments.

It should be understood that, the processor in embodiments of this disclosure may be a central processing unit (CPU). The processor may alternatively be another general-purpose processor, a digital signal processor (DSP), an application-specific integrated circuit (ASIC), a field programmable gate array (FPGA), another programmable logic device, discrete gate or transistor logic device, discrete hardware component, or the like. The general-purpose processor may be a microprocessor, or the processor may be any conventional processor or the like.

It may be understood that the memory in embodiments of this disclosure may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through an example rather than a limitative description, random access memories (RAMs) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware (for example, a circuit), firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on a computer, the procedures or functions according to embodiments of this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: Only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this disclosure, "at least one" means one or more, and "a plurality of" means two or more. "At least one of the following items (pieces)" or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

It should be understood that sequence numbers of the foregoing processes do not mean execution sequences in various embodiments of this disclosure. The execution sequences of the processes should be determined according to functions and internal logic of the processes, and should not be construed as any limitation on the implementation processes of embodiments of this disclosure.

A person of ordinary skill in the art may be aware that, with reference to units or modules, and algorithm steps of examples described in embodiments disclosed in this specification, this disclosure can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit or module, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiments are merely examples. For example, division into the units or modules is merely logical function division, or may be other division during actual implementation. For example, a plurality of units or modules may be combined or integrated into another system, some units or modules may be ignored, or functions corresponding to some units or modules are not performed. In addition, the displayed or discussed mutual couplings or direct couplings or communication connections may be implemented through some interfaces. The indirect couplings or communication connections between the apparatuses or units/modules may be implemented in electrical, mechanical, or another form.

The units/modules described as separate parts may or may not be physically separate, and parts displayed as units/modules may or may not be physical units/modules, may be located in one position, or may be distributed on a plurality of network units/modules. Some or a part of the units/modules may be selected based on actual requirements to achieve the objectives of the solutions of embodiments.

In addition, the functional units/modules in embodiments of this disclosure may be integrated into one processing unit/module, each of the units/modules may exist alone physically, or two or more units/modules are integrated into one unit/module.

When the functions are implemented in a form of a software functional unit/module and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this disclosure. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A communication method comprising:
   determining a first feedback information set, wherein the first feedback information set comprises at least one piece of feedback information, and the feedback information includes a negative acknowledgment (NACK) or an acknowledgment (ACK); and
   sending first channel state information or a first uplink reference signal to a network device responsive to determining that the first feedback information set meets a first condition; wherein:

the first feedback information set comprises at least one piece of higher-priority feedback information;

the method further comprises determining a second feedback information set, wherein the second feedback information set comprises at least one piece of lower-priority feedback information, the second feedback information set and the first feedback information set are transmitted on a same channel, and the higher-priority feedback information has a higher priority than the lower-priority feedback information; and the second feedback information set comprises one or more NACKs.

2. The method according to claim 1, wherein the first condition comprises:

a ratio of a quantity of NACKs in the first feedback information set to a quantity of ACKs in the first feedback information set is greater than or equal to a first threshold, the quantity of NACKs in the first feedback information set is greater than or equal to a second threshold, and/or a quantity of consecutive NACKs in the first feedback information set is greater than or equal to a third threshold.

3. The method according to claim 1, wherein the first condition comprises: the first feedback information set including at least one piece of higher-priority feedback information.

4. The method according to claim 1, wherein the first condition comprises: the first feedback information set including at least one piece of lower-priority feedback information.

5. The method according to claim 1, wherein the first channel state information or the first uplink reference signal is configured based on configuration information, and a first feedback information set corresponding to the configuration information comprises at least one piece of higher-priority feedback information.

6. The method according to claim 1, wherein the first channel state information or the first uplink reference signal is configured based on configuration information, and a first feedback information set corresponding to the configuration information comprises at least one piece of lower-priority feedback information.

7. The method according to claim 1, further comprising: muting the sending of the first channel state information or the first uplink reference signal responsive to determining that the first feedback information set is not sent to the network device.

8. The method according to claim 1, further comprising: sending second channel state information or a second uplink reference signal to the network device responsive to determining that the second feedback information set meets a second condition; or muting the sending of the second channel state information or the second uplink reference signal responsive to determining that the first feedback information set meets the first condition and the second feedback information set meets the second condition; or sending the second channel state information or the second uplink reference signal to the network device responsive to determining that the first feedback information set does not meet the first condition and the second feedback information set meets the second condition, wherein the second condition comprises:

a ratio of a quantity of NACKs in the second feedback information set to a quantity of ACKs in the second feedback information set is greater than or equal to a first threshold, the quantity of NACKs in the second feedback information set is greater than or equal to a second threshold, and/or a quantity of consecutive NACKs in the second feedback information set is greater than or equal to a third threshold.

9. The method according to claim 1, wherein a characteristic of the one of more NACKs in the second feedback information includes a location of the one or more NACKs.

10. A communication apparatus comprising:

at least one hardware processor in communication with at least one memory storing instructions, the at least one hardware processor being configured, upon execution of the instructions, to cause the communication apparatus at least to:

determine a first feedback information set, wherein the first feedback information set comprises at least one piece of feedback information, and the feedback information includes a negative acknowledgment (NACK) or an acknowledgment (ACK); and send first channel state information or a first uplink reference signal to a network device responsive to determining that the first feedback information set meets a first condition; wherein:

the first feedback information set comprises at least one piece of higher-priority feedback information;

the at least one hardware processor is further configured, upon execution of the instructions, to further cause the communication apparatus to determine a second feedback information set, wherein the second feedback information set comprises at least one piece of lower-priority feedback information, the second feedback information set and the first feedback information set are transmitted on a same channel, and the higher-priority feedback information has a higher priority than the lower-priority feedback information; and the second feedback information set comprises one or more NACKs.

11. The communication apparatus according to claim 10, wherein the first condition comprises:

a ratio of a quantity of NACKs in the first feedback information set to a quantity of ACKs in the first feedback information set is greater than or equal to a first threshold, the quantity of NACKs in the first feedback information set is greater than or equal to a second threshold, and/or a quantity of consecutive NACKs in the first feedback information set is greater than or equal to a third threshold.

12. The communication apparatus according to claim 10, wherein the first condition comprises: the first feedback information set including at least one piece of higher-priority feedback information.

13. The communication apparatus according to claim 10, wherein the first condition comprises: the first feedback information set including at least one piece of lower-priority feedback information.

14. The communication apparatus according to claim 10, wherein the first channel state information or the first uplink reference signal is configured based on configuration information, and a first feedback information set corresponding to the configuration information comprises at least one piece of higher-priority feedback information.

15. The communication apparatus according to claim 10, wherein the first channel state information or the first uplink reference signal is configured based on configuration information, and a first feedback information set corresponding to the configuration information comprises at least one piece of lower-priority feedback information.

16. The communication apparatus according to claim 10, wherein the at least one hardware processor is further configured, upon execution of the instructions, to further cause the communication apparatus to:

mute the sending of the first channel state information or the first uplink reference signal responsive to a determination that the first feedback information set is not sent to the network device.

17. The communication apparatus according to claim 10, wherein the at least one hardware processor is further configured, upon execution of the instructions, to further cause the communication apparatus to:

send second channel state information or a second uplink reference signal to the network device responsive to a determination that the second feedback information set meets a second condition; or mute sending of the second channel state information or the second uplink reference signal responsive to a determination that the first feedback information set meets the first condition and the second feedback information set meets the second condition; or send the second channel state information or the second uplink reference signal to the network device responsive to a determination that the first feedback information set does not meet the first condition and the second feedback information set meets the second condition, wherein the second condition comprises:
 a ratio of a quantity of NACKs in the second feedback information set to a quantity of ACKs in the second feedback information set is greater than or equal to a first threshold,
 the quantity of NACKs in the second feedback information set is greater than or equal to a second threshold, and/or
 a quantity of consecutive NACKs in the second feedback information set is greater than or equal to a third threshold.

18. The communication apparatus according to claim 10, wherein a characteristic of the one of more NACKs in the second feedback information includes a location of the one or more NACKs.

19. A communication apparatus comprising:
 at least one hardware processor in communication with at least one memory storing instructions, the at least one hardware processor being configured, upon execution of the instructions, to cause the communication apparatus at least to
 receive a first feedback information set from a terminal device, wherein the first feedback information set comprises at least one piece of feedback information, the feedback information includes a negative acknowledgment (NACK) or an acknowledgment (ACK), and the first feedback information set meets a first condition; and
 receive first channel state information or a first uplink reference signal from the terminal device;
 the first feedback information set comprises at least one piece of higher-priority feedback information;
 the at least one hardware processor is further configured, upon execution of the instructions, to further cause the communication apparatus to receive a second feedback information set, wherein the second feedback information set comprises at least one piece of lower-priority feedback information, the second feedback information set and the first feedback information set are transmitted on a same channel, and the higher-priority feedback information has a higher priority than the lower-priority feedback information; and
 the second feedback information set comprises one or more NACKs.

20. The communication apparatus according to claim 19, wherein the first condition comprises:
 a ratio of a quantity of NACKs in the first feedback information set to a quantity of ACKs in the first feedback information set is greater than or equal to a first threshold,
 the quantity of NACKs in the first feedback information set is greater than or equal to a second threshold, and/or
 a quantity of consecutive NACKs in the first feedback information set is greater than or equal to a third threshold.

* * * * *